(12) United States Patent
Niu et al.

(10) Patent No.: US 12,532,212 B2
(45) Date of Patent: Jan. 20, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Xuan Niu, Dongguan (CN); Ronghui Hou, Dongguan (CN); Lei Huang, Singapore (SG); Chaoming Luo, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 430 days.

(21) Appl. No.: 18/321,428

(22) Filed: May 22, 2023

(65) Prior Publication Data
US 2023/0300663 A1 Sep. 21, 2023

Related U.S. Application Data

(63) Continuation of application No. PCT/CN2020/137763, filed on Dec. 18, 2020.

(51) Int. Cl.
*H04W 28/02* (2009.01)
*H04W 76/15* (2018.01)

(52) U.S. Cl.
CPC ....... *H04W 28/0263* (2013.01); *H04W 76/15* (2018.02)

(58) Field of Classification Search
CPC . H04W 28/0263; H04W 76/15; H04W 76/11; H04W 84/12; H04W 28/16; H04L 5/0091; H04L 5/0053
See application file for complete search history.

(56) References Cited

U.S. PATENT DOCUMENTS

| 7,600,015 | B2 | 10/2009 | Cugi |
| 9,985,749 | B2 | 5/2018 | Dayanandan |

(Continued)

FOREIGN PATENT DOCUMENTS

| CN | 102394941 A | 3/2012 |
| CN | 107113707 A | 8/2017 |

(Continued)

OTHER PUBLICATIONS

International Search Report in the international application No. PCT/CN2020/137763, mailed on Sep. 24, 2021.

(Continued)

*Primary Examiner* — Sudesh M. Patidar
(74) *Attorney, Agent, or Firm* — PERKINS COIE LLP

(57) ABSTRACT

A wireless communication method, a terminal device and a network device are provided. The method includes: updating mapping information, wherein the mapping information is traffic identifier-to-link mapping information at a sending end; generating an indication message; and sending the indication message to a receiving end, wherein the indication message is used for indicating that the receiving end does not need to respond, with regard to the indication message, to the sending end, and the indication message comprises: updated mapping information, such that the receiving end updates, according to the updated mapping information, traffic identifier-to-link mapping information at the receiving end.

13 Claims, 25 Drawing Sheets

(56) References Cited

U.S. PATENT DOCUMENTS

| | | | |
|---|---|---|---|
| 2006/0031493 | A1 | 2/2006 | Cugi |
| 2016/0014720 | A1* | 1/2016 | Wang ................. H04L 12/1863 370/312 |
| 2020/0137626 | A1 | 4/2020 | Huang |
| 2020/0359259 | A1 | 11/2020 | Patil et al. |
| 2022/0385403 | A1* | 12/2022 | Song ..................... H04W 76/15 |
| 2023/0083654 | A1* | 3/2023 | Jang ......................... H04L 1/18 370/329 |
| 2023/0156840 | A1* | 5/2023 | Chitrakar ............. H04W 76/15 370/329 |

FOREIGN PATENT DOCUMENTS

| | | |
|---|---|---|
| CN | 110245035 A | 9/2019 |
| CN | 111385828 A | 7/2020 |
| CN | 113543243 A | 10/2021 |
| CN | 113747502 A | 12/2021 |
| CN | 113825167 A | 12/2021 |
| CN | 114079949 A | 2/2022 |

OTHER PUBLICATIONS

English translation of the Written Opinion of the International Search Authority in the international application No. PCT/CN2020/137763, mailed on Sep. 24, 2021.

"IEEE P802.11be™/D0.1 Draft Standard for Information technology—Tele-communications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), Sep. 2020.

Edward Au, Huawei, "IEEE P802.11 Wireless LANs Specification framework for TGbe", Address: 400-303 Terry Fox Drive, Ottawa, ON, K2K 3J1, Nov. 10, 2020, doc.: IEEE 802.11-19/1262r20.

Guogang Huang et al, Huawei, "TID-to-Link Mapping Negotiation", doc.: IEEE 802.11-20/1511r0, Sep. 2, 2020.

Abhishek Patil et al, Qualcomm Inc., "MLO: Protocol for TID-to-link negotiation", doc.: IEEE 802.11-20/1044r0, Feb. 26, 2020.

Abhishek Patil et al, Qualcomm Inc., "Multi-TID ML BA Negotiation Scheme", doc.: IEEE 802.11-20/0914r0, Jun. 6, 2020.

Abhishek Patil et al, Qualcomm Inc., "MLO: TID-to-link negotiation", doc.: IEEE 802.11-20/1044r2, Feb. 26, 2020.

Huawei, HiSilicon, "LTE-WLAN interworking enhancement", 3GPP TSG-RAN WG2 Meeting #89bis, R2-151572, Apr. 20-24, 2015.

Guogang Huang (Huawei): "TID-to-link Mapping Negotiation", IEEE Draft; 11-20-1551-02-00BE-TID-To-Link-Mapping-Negotiation, IEEE-SA Mentor, Piscataway, NJ USA, vol. 802.11 EHT; 802.11be, No. 2, Dec. 17, 2020 (Dec. 17, 2020), XP068175531, slides 2 to 5, 10 pages.

Edward Au (Huawei): "Specification Framework for TGbe", IEEE Draft; 11-19-1262-21-00BE-Specification-Framework-For-Tgbe, IEEE-SA Mentor, Piscataway, NJ USA, vol. 802.11 EHT; 802.1tbe, No. 2, Dec. 13, 2020 (Dec. 3, 2020), XP068175382, paragraph 6.4.1, paragraph 6.4.2, 100 pages.

Yongho Seok (Mediatek) :"Multi-link Operation Management", IEEE Draft; 11-19-1358-05-00BE-Multi-Link-Operation-Ma Nagement, IEEE-SA Mentor, Piscataray, NJ USA vol. 802.11 EHT; 802.11be, No. 5, Nov. 1, 2020 (Nov. 1, 2020), XP068174145, slides 2, 8, 9, 11, 15 pages.

Supplementary European Search Report in the European application No. 20965663.6, mailed on Sep. 25, 2023, 11 pages.

First Office Action of the Chinese application No. 202310478024.7, issued on Aug. 31, 2024. 12 pages with English translation.

\* cited by examiner

| Element ID | Length | Element ID Extension | Multi-link Control field | MLD MAC address | TID-to-link mapping information | Others | Optional Subelements |
|---|---|---|---|---|---|---|---|

FIG. 8

WIRELESS COMMUNICATION METHOD, TERMINAL DEVICE AND NETWORK DEVICE

CROSS-REFERENCE TO RELATED APPLICATION

The present disclosure is a US continuation application of International Application No. PCT/CN2020/137763 filed on Dec. 18, 2020. The disclosure of the above application is hereby incorporated by reference in its entirety.

BACKGROUND

Multi-link (ML) related standards include ML discovery, ML establishment, link management, ML block recovery, ML energy saving and so on. The main research point of link management is the Traffic Identifier (TID) to link (TID-to-link) mapping. The standard requires that each TID must be mapped to a link or a link set to ensure that the service flow corresponding to the TID can be transmitted.

At present, the change of TID-to-link mapping information is obtained through negotiation of Multi-link Device (MLD). There are three situations. 1. If the link set responded by the receiver is the same as the link set provided by the sender, the TID-to-link mapping result is the link set provided by the sender, and the negotiation is regarded as successful. 2. If the receiver provides a group of spare link set, and the spare link set is a non-empty subset of the link set provided by the sender, the mapping result is the spare link set provided by the receiver, and the negotiation is regarded as successful. 3. If the link set responded by the receiver is an empty set, the original mapping of TID-to-link will be maintained, and the negotiation will be regarded as failure.

SUMMARY

Embodiments of the present disclosure relate to the field of communication, and in particularly to a wireless communication method, a terminal device and a network device.

The embodiments of the present disclosure provide a wireless communication method, a terminal device and a network device, thereby reducing signaling overhead.

In a first aspect, a wireless communication method is provided. The method includes the following operations. First mapping information is updated. The first mapping information is traffic identifier (TID) to uplink mapping information at a station (STA) multi-link device (MLD) side. A first indication message is generated. The first indication message is transmitted to an access point (AP) MLD. The first indication message is configured to indicate that the AP MLD does not need to respond to a STA MLD for the first indication message, and the first indication message includes updated first mapping information.

In a second aspect, a wireless communication method is provided. The method includes the following operations. A first indication message is received. The first indication message includes updated first mapping information. Second mapping information is updated according to the updated first mapping information. The first mapping information is TID to uplink mapping information at a SAT MLD side. The second mapping information is TID to uplink mapping information at an AP MLD side. The first indication message is configured to indicate that the AP MLD does not need to respond to a STA MLD for the first indication message.

In a third aspect, a wireless communication method is provided. The method includes the following operations. Third mapping information is updated. The third mapping information is TID to downlink mapping information at an AP MLD side. A second indication message is generated. The second indication message is transmitted to a STA MLD. The second indication message is configured to indicate that the STA MLD does not need to respond to an AP MLD for the second indication message. The second indication message includes updated third mapping information.

In a fourth aspect, a wireless communication method is provided. The method includes the following operations. A second indication message is received. The second indication message includes updated third mapping information. Fourth mapping information is updated according to the updated third mapping information. The third mapping information is TID to downlink mapping information at an AP MLD side. The fourth mapping information is TID to downlink mapping information at a STA MLD side. The second indication message is configured to indicate that the STA MLD does not need to respond to an AP MLD for the second indication message.

In a fifth aspect, a terminal device is provided. The terminal device is configured to perform the method in the above first aspect, the fourth aspect or various implementations thereof.

Specifically, the terminal device includes functional modules used for performing the method in the above first aspect, the fourth aspect or various implementations thereof.

In a sixth aspect, a network device is provided. The network device is configured to perform the method in the above second aspect, the third aspect or various implementations thereof.

Specifically, the network device includes functional modules used for performing the method in the above second aspect, the third aspect or various implementations thereof.

In a seventh aspect, a terminal device is provided. The terminal device includes a processor and a memory. The memory is configured to store computer programs, and the processor is configured to invoke and run the computer programs stored in the memory to perform the method in the above first aspect, the fourth aspect or various implementations thereof.

In an eighth aspect, a network device is provided. The network device includes a processor and a memory. The memory is configured to store computer programs, and the processor is configured to invoke and run the computer programs stored in the memory to perform the method in the above second aspect, the third aspect or various implementations thereof.

In a ninth aspect, an apparatus is provided. The apparatus is configured to implement the method in any of the first aspect to fourth aspect or various implementations thereof.

Specifically, the apparatus includes a processor. The processor is configured to invoke and run computer programs from a memory to cause a device on which the apparatus is installed to perform the method in any of the first aspect to fourth aspect or various implementations thereof.

In a tenth aspect, a computer-readable storage medium for storing computer programs is provided. The computer programs cause a computer to perform the method in any of the first aspect to fourth aspect or various implementations thereof.

In an eleventh aspect, a computer program product including computer program instructions is provided. The computer program instructions cause a computer to perform the method in any of the first aspect to fourth aspect or various implementations thereof.

In a twelfth aspect, a computer program is provided. When the computer program is run on a computer, the computer performs the method in any of the first aspect to fourth aspect or various implementations thereof.

BRIEF DESCRIPTION OF THE DRAWINGS

FIG. 8 is a schematic diagram of an ML information element provided by the embodiments of the present disclosure.

DETAILED DESCRIPTION

At present, all of the changes of TID-to-link mapping information adopt request/response negotiation mode. However, TID-to-link mapping scenarios are diverse, the negotiation mode may not be needed in some specific scenarios. If the negotiation mode is adopted, the signaling overhead will be too high.

In the present disclosure, a remapping mandatory mode is adopted. That is, the access point multi-link device does not need to respond to the STA MLD for the first indication message. The STA MLD does not need to respond to the AP MLD for the second indication message, thereby reducing signaling overhead.

The technical solutions of the embodiments of the present disclosure will be described below in conjunction with the accompanying drawings in the embodiments of the present disclosure. It is obvious that the described embodiments are part of the embodiments of the present disclosure, but not all of them. With respect to the embodiments in the present disclosure, all other embodiments obtained by those of ordinary skill in the art without making creative efforts fall within the scope of protection of the present disclosure.

As mentioned above, at present, the change of TID-to-link mapping information is obtained through negotiation of MLD. There are the above three situations. In fact, these three situations are applicable to the expansion, contraction and switching scenarios of negotiation of TID-to-link mapping. The applications of the above three situations in the three scenarios are explained below.

Figure 1:
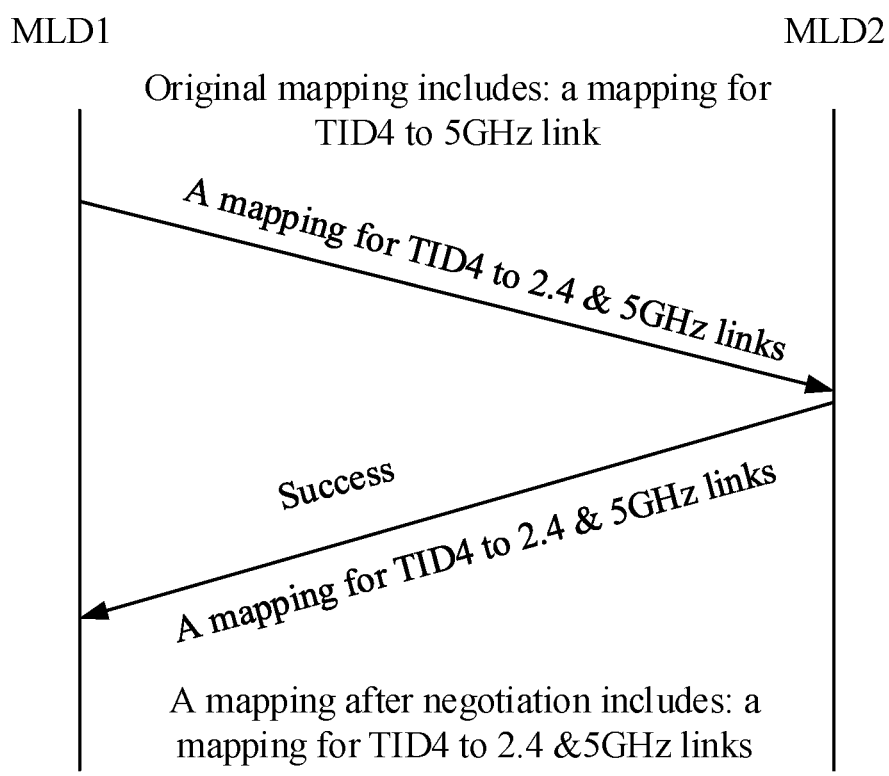
FIG. 1 provides a schematic diagram of an expansion scenario for TID-to-link mapping.

FIG. 1 provides a schematic diagram of an expansion scenario for the negotiation of TID-to-link mapping. As shown in FIG. 1, the original mapping includes a mapping for TID4 to 5 GHz link. The mapping provided by MLD1 includes a mapping for TID4 to 2.4 & 5 GHz links. MLD2 agrees with the mapping provided by MLD1. That is, the mapping responded by MLD2 includes the mapping for TID4 to 2.4 & 5 GHz links. Based on this, the mapping negotiation is successful, and the mapping after negotiation includes the mapping for TID4 to 2.4 & 5 GHz links.

Figure 2:
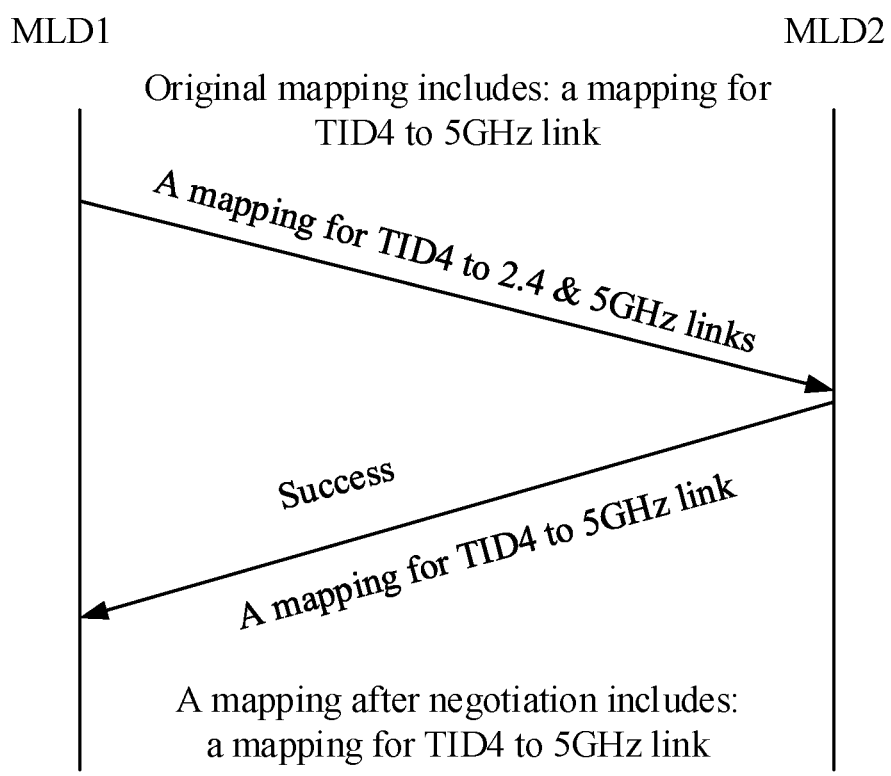
FIG. 2 provides a schematic diagram of another expansion scenario for TID-to-link mapping.

FIG. 2 provides a schematic diagram of another expansion scenario for the negotiation of TID-to-link mapping. As shown in FIG. 2, the original mapping includes a mapping for TID4 to 5 GHz link. The mapping provided by MLD1 includes a mapping for TID4 to 2.4 & 5 GHz links. MLD2 does not agree to map TID4 to 2.4 GHz link. That is, the mapping responded by MLD2 includes the mapping for TID4 to 5 GHz link. In this case, the mapping negotiation is considered to be successful, and the mapping after negotiation includes the mapping for TID4 to 5 GHz link.

Figure 3:
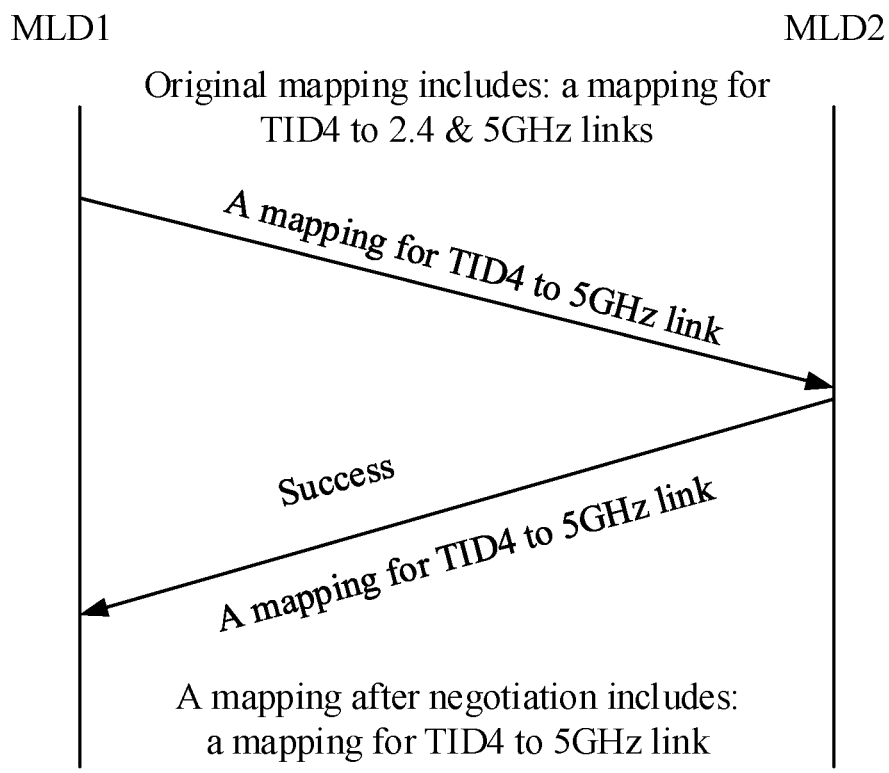
FIG. 3 provides a schematic diagram of a contraction scenario for TID-to-link mapping.

FIG. 3 provides a schematic diagram of a contraction scenario for the negotiation of TID-to-link mapping. As shown in FIG. 3, the original mapping includes a mapping for TID4 to 2.4 & 5 GHz links. The mapping provided by MLD1 includes a mapping for TID4 to 5 GHz link. MLD2 agrees with the mapping provided by MLD1. That is, the mapping responded by MLD2 includes the mapping for TID4 to 5 GHz link mapping. Based on this, the mapping negotiation is successful, and the mapping after negotiation includes the mapping for TID4 to 5 GHz link.

Figure 4:
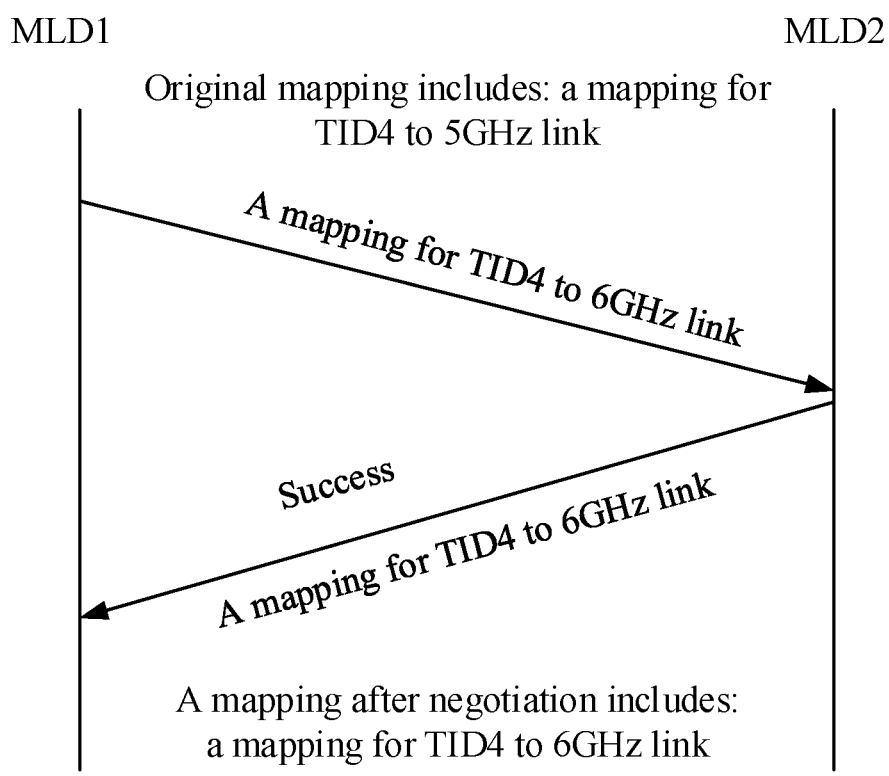
FIG. 4 provides a schematic diagram of a switching scenario for TID-to-link mapping.

FIG. 4 provides a schematic diagram of a switching scenario for the negotiation of TID-to-link mapping. As shown in FIG. 4, the original mapping includes a mapping for TID4 to 5 GHz link. The mapping provided by MLD1 includes a mapping for TID4 to 6 GHz link. MLD2 agrees with the mapping provided by MLD1. That is, the mapping responded by MLD2 includes the mapping for TID4 to 6 GHz link. Based on this, the mapping negotiation is successful, and the mapping after negotiation includes the mapping for TID4 to 6 GHz link.

Figure 5:
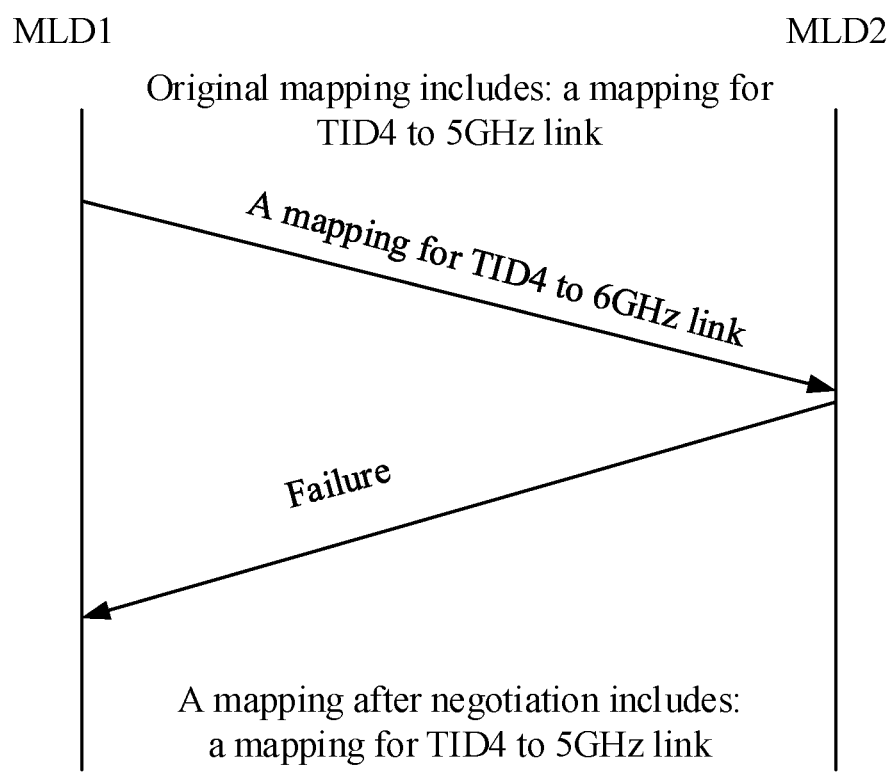
FIG. 5 provides a schematic diagram of another switching scenario for TID-to-link mapping.

FIG. 5 provides a schematic diagram of another switching scenario for the negotiation of TID-to-link mapping. As shown in FIG. 5, the original mapping includes a mapping for TID4 to 5 GHz links. The mapping provided by MLD1 includes a mapping for TID4 to 6 GHz link. MLD2 disagrees with the mapping provided by MLD1. That is, the link set responded by MLD2 is an empty set. Based on this, the mapping negotiation is unsuccessful, so the original mapping, i.e., the mapping for TID4 to 5 GHz link, is maintained.

Figure 6:
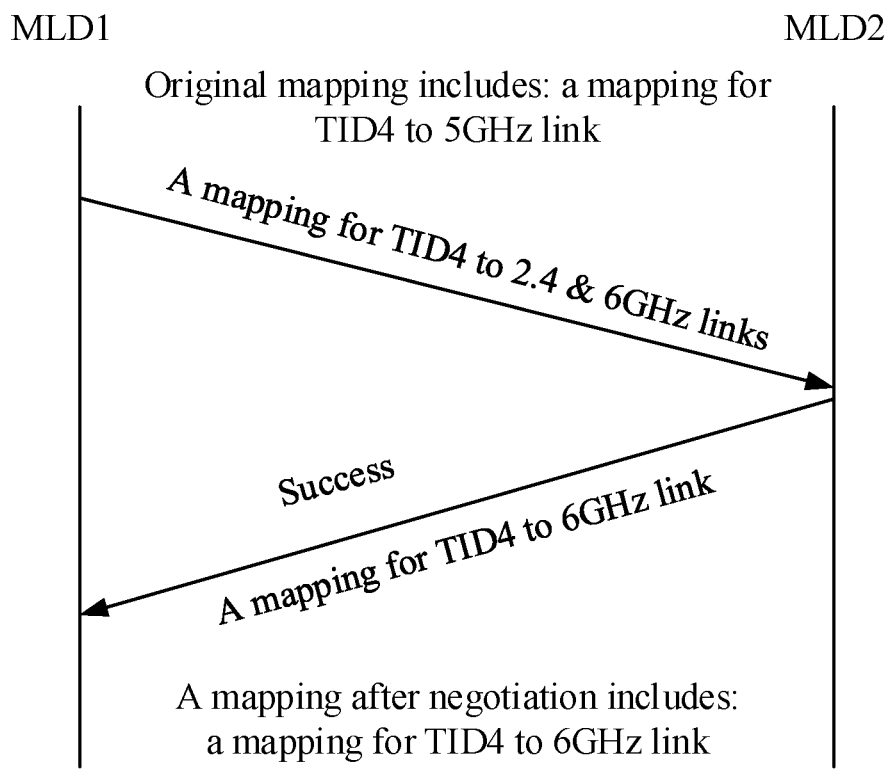
FIG. 6 provides a schematic diagram of yet another switching scenario for TID-to-link mapping.

FIG. 6 provides a schematic diagram of yet another switching scenario for the negotiation of TID-to-link mapping. As shown in FIG. 6, the original mapping includes a mapping for TID4 to 5 GHz link. The mapping provided by MLD1 includes a mapping for TID4 to 2.4 & 6 GHz links. MLD2 does not agree to map TID4 to 2.4 GHz link. The mapping responded by MLD2 includes the mapping for TID4 to 6 GHz link. Based on this, the mapping negotiation is considered to be successful, and the mapping after negotiation includes the mapping for TID4 to 6 GHz link.

As mentioned above, at present, all of the TID-to-link mappings adopt the request/response negotiation mode. However, in some specific scenarios, the sender may decide the mapping solution, and the receiver only needs to acquire the mapping solution. The specific examples are shown in the following.

Exemplarily, when a STA MLD (non-AP MLD) has a large number of service flows corresponding to a certain uplink TID, it is needed to try to provide the dedicated link set for the uplink TID. In this case, the STA MLD initiates a remapping request to remove other uplink TIDs on at least one original link of the TID mapping. At this time, the link set corresponding to each TID in the updated TID-to-link mapping is a non-empty subset of the link set of each TID original mapping, which corresponds to the contraction scenario. In this case, for the STA MLD, it is desirable that the AP MLD directly accepts the remapping request.

Exemplarily, based on the perspective of system performance enhancement, an AP MLD has link state information of all stations associated with it, so that a better mapping result of the TID-to-link may be obtained by some algorithm, and it is guaranteed that the mapping result meets the transmission requirements of the STA MLD. In this case, for the AP MLD, it is desirable that the STA MLD directly accepts the better mapping result.

In the above scenario, or in other possible scenarios, if the receiver still replies to the response information, the signaling overhead will increase.

In order to solve the above technical problems, the present disclosure adopts a mandatory mode, which indicates that the receiver does not need to reply to the response information, so as to reduce the signaling overhead.

The architecture of the communication system in the present disclosure will be described below in combination with FIG. 7.

Figure 7:
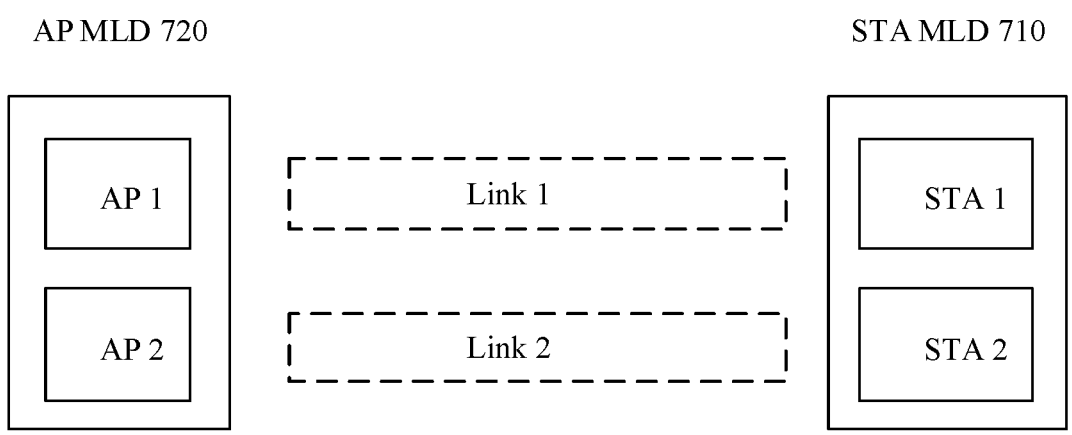
FIG. 7 is a schematic diagram of architecture of a communication system provided by the embodiments of the present disclosure.

Exemplarily, FIG. 7 is a schematic diagram of architecture of a communication system provided by the embodiments of the present disclosure. Referring to FIG. 7, the communication system includes a STA MLD 710 and an AP MLD 720. There may be at least two links between the STA MLD 710 and the AP MLD 720 for wireless communication. Alternatively, the communication system may include a plurality of STA MLDs 710, and may also include a plurality of AP MLDs 720, which are not limited by the embodiments of the present disclosure.

It should be understood that the STA MLD 710 may include at least one station (STA). Therefore, the STA MLD 710 may be understood as a logical entity. FIG. 7 exemplarily illustrates that the STA MLD 710 includes two STAs.

It should be understood that the AP MLD 720 may include at least one access point (AP). Therefore, the AP MLD 720 may be understood as a logical entity. FIG. 7 exemplarily illustrates that the AP MLD 720 includes two APs.

It should be understood that there may be one link between one AP and one STA.

Alternatively, the communication system shown in FIG. 7 may also include other network entities such as a Mobility Management Entity (MME), an Access and Mobility Management Function (AMF), etc., which is not limited by the embodiments of the present disclosure.

It should be understood that the terms "system" and "network" are often used interchangeably herein.

Alternatively, the communication system in the embodiments of the present disclosure may be applied to a Carrier Aggregation (CA) scenario, a Dual Connectivity (DC) scenario, and a Standalone (SA) network distribution scenario.

Alternatively, the embodiments of the present disclosure may be applied to an unlicensed spectrum as well as to a licensed spectrum. The unlicensed spectrum may also be considered as a shared spectrum, and the licensed spectrum may also be considered as a non-shared spectrum.

It should be understood that the STA MLD and the AP MLD need to firstly perform multi-link discovery, multi-link establishment, and the TID-to-link mapping establishment, which will be described in the following.

Step 1: Multi-Link Discovery

The basic goal of multi-link discovery is that the STA MLD can acquire the information of the AP MLD and all the links it supports by receiving a Beacon frame or a Probe Response frame from any accessory AP of the AP MLD. Its essence is a multi-link scanning process, that is, multi-link discovery.

After the multi-link discovery phase is completed, the STA MLD acquires complete or partial information of the accessory APs of the AP MLD.

Step 2: Multi-Link Establishment

The basic goal of multi-link establishment is that the STA MLD and the AP MLD interact with the complete information of their respective accessory STAs and APs, and complete multi-link establishment according to their respective capability information. Its essence is a multi-link association process, that is, multi-link establishment.

The following step 2.1 and step 3 respectively describe the establishment process of TID-to-link mapping information between the STA MLD and the AP MLD in the non-default mode of TID-to-link mapping.

The default mode of TID-to-link mapping is that all TIDs are mapped to all established links. However, if the non-default mode is adopted during initialization, the preliminary negotiation of TID-to-link mapping is needed to be performed between the STA MLD and the AP MLD.

Step 2.1 (the First Alternative Manner for Establishing TID-to-Link Mapping): TID-to-Link Mapping Information Establishment in Multi-Link Establishment Phase Alternatively, TID-to-link mapping information establishment may be included in the multi-link establishment phase. The specific embodiment is to place the TID-to-link mapping information as a field in the ML information element of the association request/response frame used in the multi-link establishment phase. FIG. 8 is a schematic diagram of an ML information element provided by the embodiments of the present disclosure. ML information element includes TID-to-link mapping information, as shown in FIG. 8.

Step 3 (the Second Alternative Manner for Establishing TID-to-Link Mapping): The Multi-Link Establishment Phase is Independent from the TID-to-Link Mapping Information Establishment Phase.

Alternatively, the TID-to-link mapping information may be included in an independent phase in which the TID-to-link mapping information is included in the information element of the corresponding management frame.

Through the above steps, the TID-to-link mapping information between the STA MLD and the AP MLD is established.

The present disclosure will focus on updating the TID-to-link mapping information, and the technical solutions of the present disclosure will be described in detail below.

Embodiment 1

Figure 9:
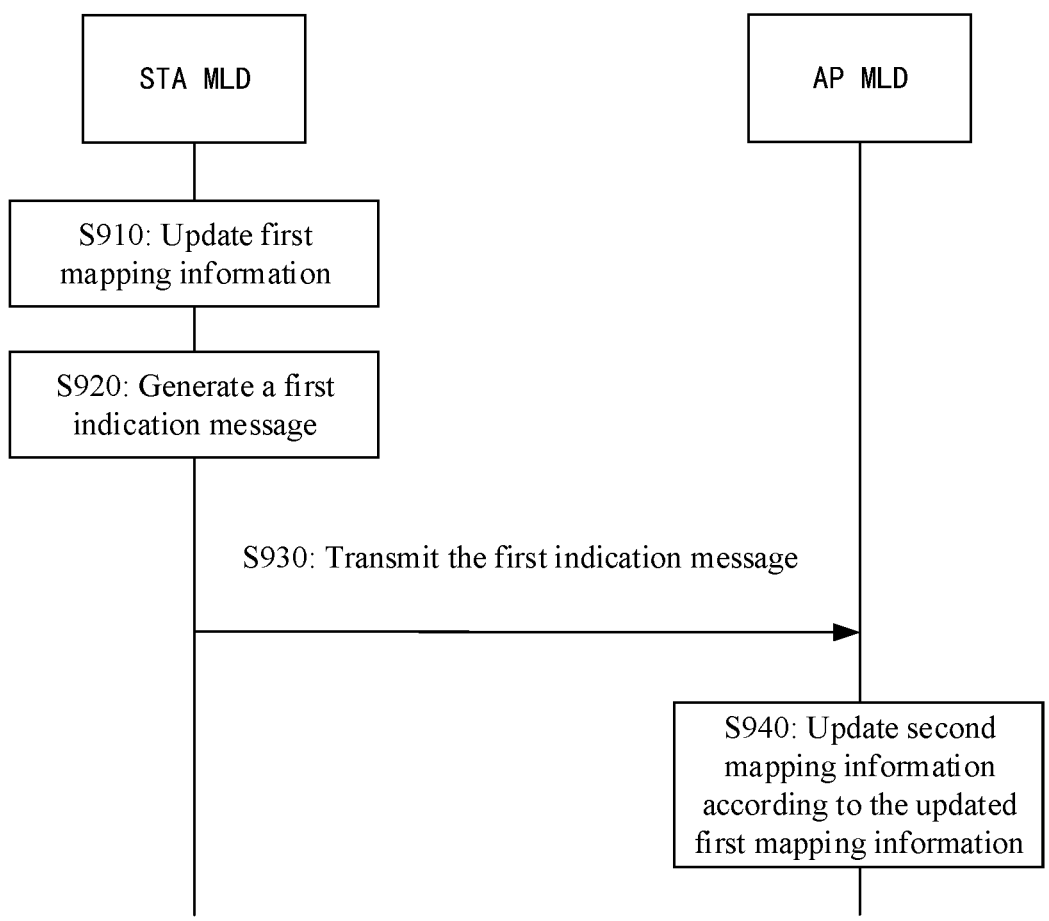
FIG. 9 is an interactive flow chart of a wireless communication method provided by the embodiments of the present disclosure.

FIG. 9 is an interactive flow chart of a wireless communication method provided by the embodiments of the present disclosure. As shown in FIG. 9, the method includes the following operations.

In operation S910, the STA MLD updates the first mapping information.

In operation S920, the STA MLD generates the first indication message.

In operation S930, the STA MLD transmits the first indication message to the AP MLD.

In operation S940, the AP MLD updates the second mapping information according to the updated first mapping information.

It should be understood that the first mapping information is TID to uplink mapping information at the STA MLD side.

It should be understood that the TID referred to in the first mapping information may be all uplink TIDs of the STA MLD, or the uplink TID whose corresponding mapping information is to be updated, which is not limited by the present disclosure.

It should be understood that the TID referred to in the first mapping information may be one or more. If there is one TID, the first mapping information is TID to uplink mapping information at the STA MLD side. If there are more TIDs, the first mapping information is the mapping information for the more TIDs to uplinks at the STA MLD side.

It should be understood that one TID may be corresponded to or mapped to at least one link. For example, TID1 may be mapped to link 1 and link 2, and TID 2 may be mapped to link 1.

It should be understood that the STA MLD may update the first mapping information in the contraction scenario as above.

Figure 10:
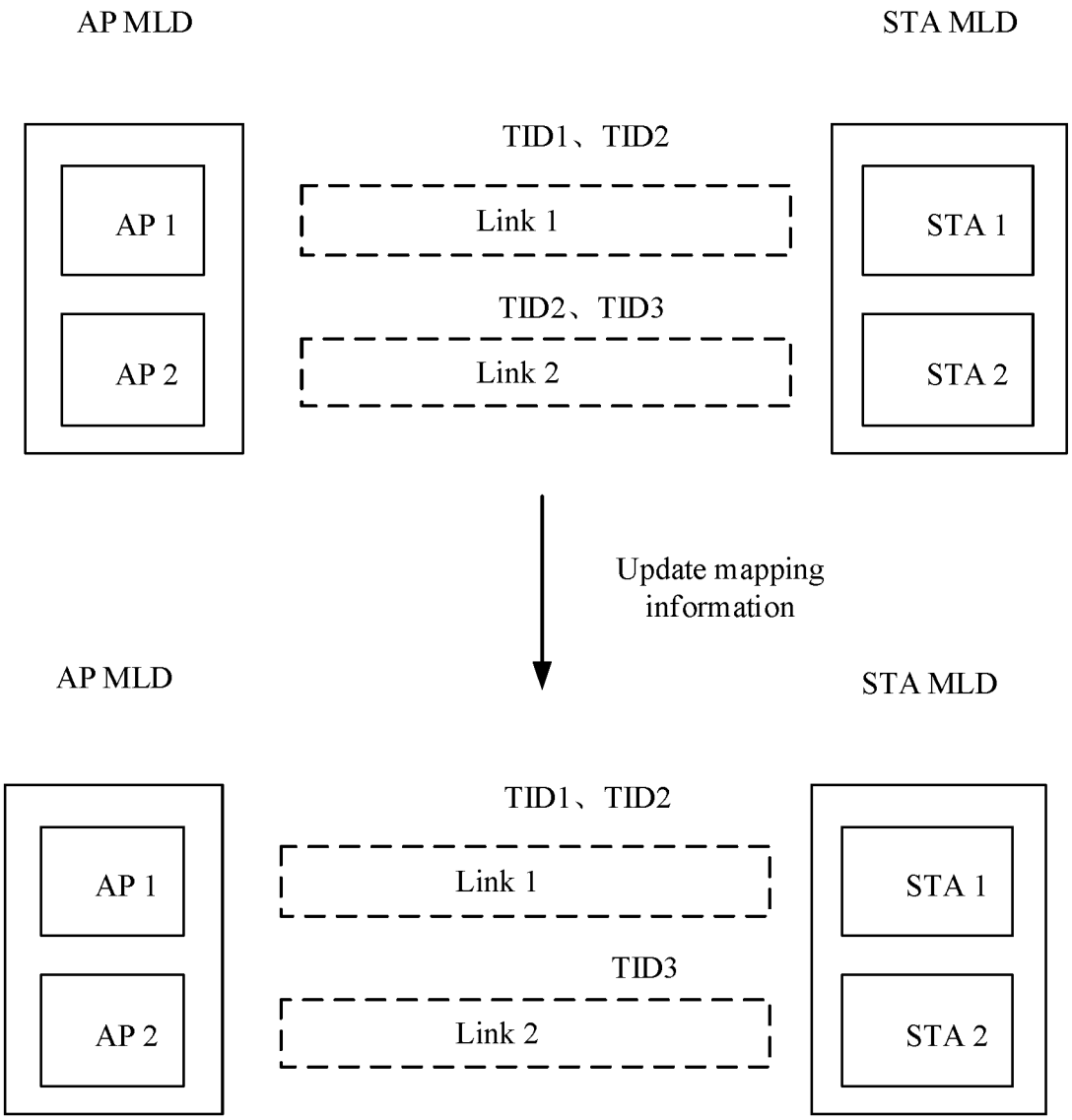
FIG. 10 is a schematic diagram for updating TID-to-link mapping information provided by the embodiments of the present disclosure.

Exemplarily, FIG. 10 is a schematic diagram for updating TID-to-link mapping information provided by the embodiments of the present disclosure. As shown in FIG. 10, there are two links, link 1 and link 2, between the STA MLD and the AP MLD. In the initial state, TID1 and TID2 are mapped to link 1, and TID2 and TID3 are mapped to link 2. At this time, if the STA MLD has a large number of service flows of TID3, in order to meet the service flow requirement of TID3, TID2 on link 2 is needed to be removed. At this time, the STA MLD updates the mapping information for various TIDs to the links. That is, a remapping mandatory mode is performed. As shown in FIG. 10, after updating the mapping information for various TIDs to links, the TIDs on link 1 remain unchanged, and only TID 3 is mapped to link 2.

Alternatively, the STA MLD may transmit the first indication message to an accessory AP of the AP MLD through an accessory station in the STA MLD.

It should be noted that for an established link, if at least one TID is mapped to the link, the state of the link is an enabled state. Otherwise, the state of the link is a disabled state.

Alternatively, the uplink corresponding to the accessory station is in the enabled state.

Alternatively, the uplink corresponding to the accessory AP is in the enabled state.

It should be understood that the above first indication message may be an implicit indication message or an explicit indication message, which is not limited by the present disclosure.

It should be understood that the first indication message is used to indicate that the AP MLD does not need to respond to the STA MLD for the first indication message. That is, the first indication message is used to indicate that the remapping mandatory mode is adopted. In addition, the first indication message includes the updated first mapping information.

Alternatively, the updated first mapping information includes mapping information for at least one TID to a corresponding uplink set.

It should be noted that when the TID referred to in the first mapping information is all uplink TIDs of the STA MLD, the above at least one TID may be all uplink TIDs of the STA MLD. When the TID in the first mapping information is the uplink TID whose corresponding mapping information is to be updated, the above at least one TID may be the uplink TID whose corresponding mapping information is to be updated.

Alternatively, for any one of the at least one TID, the uplink set corresponding to the TID is a non-empty subset of an established uplink set between the STA MLD and the AP MLD after updating the first mapping information. For example, as shown in FIG. 10, after updating the mapping information for various TIDs, the uplink set corresponding to TID1 still includes link 1, the uplink set corresponding to TID2 only includes link 1, and the uplink set corresponding to TID3 still includes link 2. The established uplink set between the STA MLD and the AP MLD includes link 1 and link 2. It can be seen that the uplink sets respectively corresponding to TID1, TID2 and TID3 are the non-empty subsets of the established uplink set between the STA MLD and the AP MLD.

Alternatively, for any one of the at least one TID, the uplink set corresponding to the TID is a non-empty subset of the first mapping link set between the STA MLD and the AP MLD after updating the first mapping information. The first mapping link set is an uplink set corresponding to the TID before updating the first mapping information. For example, as shown in FIG. 10, before updating the mapping information for various TIDs, the uplink set corresponding to TID1 (i.e., the first mapping link set corresponding to TID1) includes link 1, and after updating the mapping information, the uplink set corresponding to TID1 still includes link 1.

Before updating the mapping information for various TIDs, the uplink set corresponding to TID2 (i.e., the first mapping link set corresponding to TID2) includes link 1 and lnk 2, and after updating the mapping information, the uplink set corresponding to TID2 only includes link 1. Before updating the mapping information for various TIDs, the uplink set corresponding to TID3 (i.e., the first mapping link set corresponding to TID3) includes link 2, and after updating the mapping information, the uplink set corresponding to TID3 still includes link 2. It can be seen that after updating the mapping information, the uplink sets respectively corresponding to TID1, TID2 and TID3, are the non-empty subsets of their respective corresponding first mapping link sets.

Further, after receiving the updated first mapping information, the AP MLD updates the second mapping information. The second mapping information is TID to uplink mapping information at the AP MLD side.

It should be understood that the TID referred to in the second mapping information may be all uplink TIDs of the STA MLD, or the uplink TID whose corresponding mapping information is to be updated, which is not limited by the present disclosure.

It should be understood that the TID referred to in the second mapping information may be one or more. If there is one TID, the second mapping information is TID to uplink mapping information at the AP MLD side. If there are more TIDs, the second mapping information is the mapping information for the more TIDs to uplinks at the AP MLD side.

It should be understood that the first mapping information is the same as the second mapping information before updating the first mapping information and the second mapping information, i.e. at the initial phase.

It should be understood that the updated first mapping information is the same as the updated second mapping information. That is, the TID-to-link mapping information is consistent at the STA MLD side and the AP MLD side.

In view of above, in the present disclosure, a remapping mandatory mode may be adopted. That is, the AP MLD does not need to respond to the STA MLD for the first indication message, thereby reducing signaling overhead.

As mentioned above, the first indication message may be an implicit indication message or an explicit indication message. That is, the implicit manner may be adopted to indicate that the AP MLD does not need to respond to the STA MLD for the first indication message, or the explicit manner may be adopted to indicate that the AP MLD does not need to respond to the STA MLD for the first indication message. These two manners will be explained respectively below.

Embodiment 2

The first indication message may be an explicit indication message. For example, the first indication message includes first indication information. The first indication information is used to indicate that the AP MLD does not need to respond to the STA MLD for the first indication message. The carrying manner for the first indication message will be explained by example below.

Figure 11:
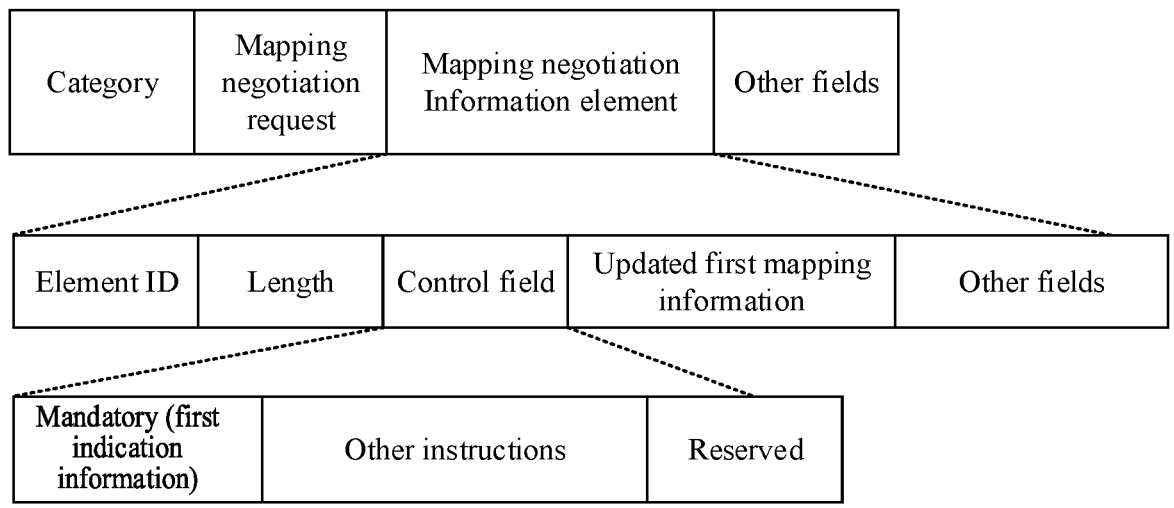
FIG. 11 is a schematic diagram of a mapping negotiation request frame provided by the embodiments of the present disclosure.

In the example 1, FIG. 11 is a schematic diagram of a mapping negotiation request frame provided by the embodiments of the present disclosure. As shown in FIG. 11, the mapping negotiation request frame includes a mapping negotiation information element. The mapping negotiation information element includes first indication information and updated first mapping information. Alternatively, the first indication information may be carried in a mandatory field in a control field in the mapping negotiation information element. In addition, the mapping negotiation request frame may also include a category field, a mapping negotiation request field, and other fields, etc. Other fields except the mapping negotiation information element in the mapping negotiation request frame are not limited in the present disclosure.

It should be understood that the mapping negotiation request frame is a form of action frame.

Alternatively, the category field may be filled with an Extremely High Throughput (EHT) category.

Alternatively, the length of the first indication information may be 1 bit. The first indication information may be 1. It is indicated that the AP MLD does not need to respond to the STA MLD for the first indication message. If the field in which the first indication information is located is not filled with 1, for example, it is filled with 0, it is indicated that the AP MLD needs to respond to the STA MLD for the first indication message.

It should be noted that the mapping negotiation request frame provided in FIG. 11 is an improvement of the mapping negotiation request frame in the prior art, in which the mapping negotiation request frame does not have the mandatory field. In the present disclosure, the mapping negotiation request frame carries the mandatory field, which may be used to fill the first indication information.

Figure 12:
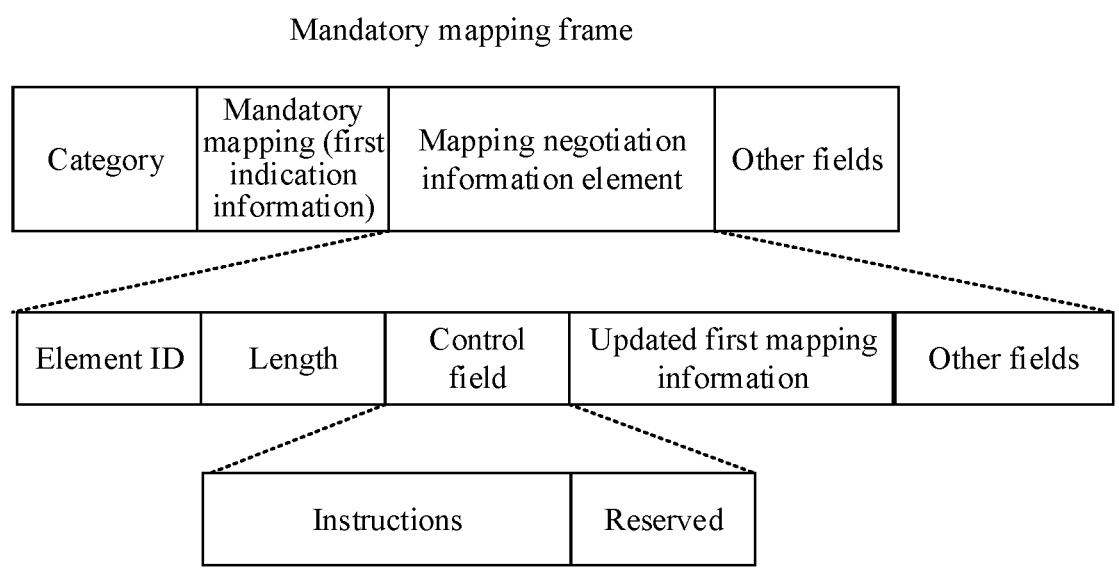
FIG. 12 is a schematic diagram of a mandatory mapping frame provided by the embodiments of the present disclosure.

In example 2, FIG. 12 is a schematic diagram of a mandatory mapping frame provided by the embodiments of the present disclosure. As shown in FIG. 12, the mandatory mapping frame includes a mandatory mapping field and a mapping negotiation information element. The mandatory mapping field may be filled with first indication information. The mapping negotiation information element includes updated first mapping information. In addition, the mandatory mapping frame may also include a category field and other fields, etc. Other fields except the mapping negotiation information element in the mandatory mapping frame are not limited in the present disclosure.

It should be understood that the mandatory mapping frame is a form of the action frame.

Alternatively, the category field may be filled with an EHT category.

It should be noted that the mandatory mapping frame provided in FIG. 12 differs from the mapping negotiation request frame provided in FIG. 11 in that the mandatory mapping frame provided in FIG. 12 does not carry the mandatory field in the mapping negotiation information element.

It should be understood that the carrying manner of the first indication information is not limited to the cases shown in FIG. 11 and FIG. 12. The first indication information may also be carried in other frames, or in other fields in the mapping negotiation request frame or the mandatory mapping frame, which is not limited by the present disclosure.

Further, after the AP MLD receives the mapping negotiation request frame, the mandatory field in the mapping negotiation request frame is resolved. If the first indication information such as 1 is carried in the mandatory field, it represents that there is no need to respond to the STA MLD for the mapping negotiation request frame. If the first indication information is not carried in the mandatory field, for example, 0 is carried, it represents that it is needed to respond to the STA MLD for the mapping negotiation request frame. Alternatively, after the AP MLD receives the mandatory mapping frame, if the mandatory mapping field after the category field is resolved, it represents that there is no need to respond to the STA MLD for the mandatory mapping frame.

In the present disclosure, the first indication message may explicitly indicate that the AP MLD does not need to respond to the STA MLD for the first indication message, thereby reducing signaling overhead.

Embodiment 3

The first indication message may be an implicit indication message. The implicit indication manner will be illustrated by examples below.

Alternatively, after receiving the first indication message, the AP MLD resolves it and obtains the updated first mapping information. Based on this, the second mapping information is updated. Further, the AP MLD may perform the following comparison: whether the uplink set corresponding to each TID is a non-empty subset of the first mapping link set between the STA MLD and the AP MLD. If so, it is determined that there is no need to respond to the STA MLD for the first indication message.

Exemplarily, as shown in FIG. 10, before updating the mapping information for various TIDs, the uplink set corresponding to TID1 (i.e., the first mapping link set corresponding to TID1) includes link 1, and after updating the mapping information, the uplink set corresponding to TID1 still includes link 1. Before updating the mapping information for various TIDs, the uplink set corresponding to TID2 (i.e., the first mapping link set corresponding to TID2) includes link 1 and link 2, and after updating the mapping information, the uplink set corresponding to TID2 only includes link 1. Before updating the mapping information for various TID, the uplink set corresponding to TID3 (i.e., the first mapping link set corresponding to TID3) includes link 2, and after updating the mapping information, the uplink set corresponding to TID3 still includes link 2. It can be seen that after the mapping information is updated, the uplink sets corresponding to TID1, TID2 and TID3, respectively, are non-empty subsets of their respective corresponding first mapping link sets. Based on this, it is determined that the AP MLD does not need to respond to the STA MLD for the first indication message.

The carrying manner for the first indication message will be explained by example below.

Figure 13:
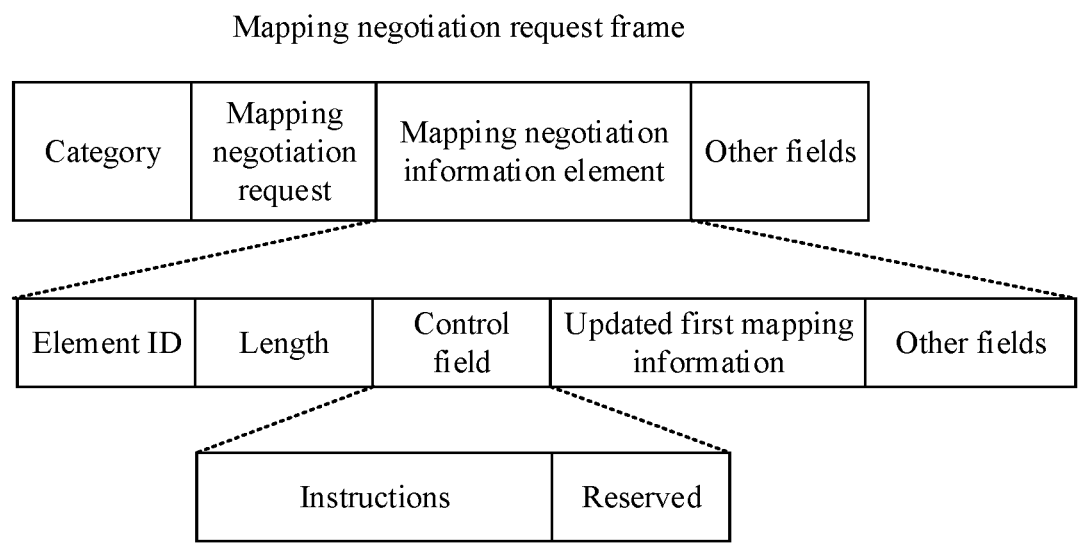
FIG. 13 is a schematic diagram of a mapping negotiation request frame provided by the embodiments of the present disclosure.

FIG. 13 is a schematic diagram of a mapping negotiation request frame provided by the embodiments of the present disclosure. As shown in FIG. 13, the mapping negotiation request frame includes a mapping negotiation information element. The mapping negotiation information element includes the updated first mapping information, but does not include the first indication information. In addition, the mapping negotiation request frame may also include a category field, a mapping negotiation request field and other fields, etc. Other fields except the mapping negotiation information element in the mapping negotiation request frame are not limited in the present disclosure.

It should be understood that the mapping negotiation request frame is a form of action frame.

Alternatively, the category field may be filled with an EHT category.

In the present disclosure, the first indication message may implicitly indicate that the AP MLD does not need to respond to the STA MLD for the first indication message, thereby reducing signaling overhead.

Embodiment 4

Figure 14:
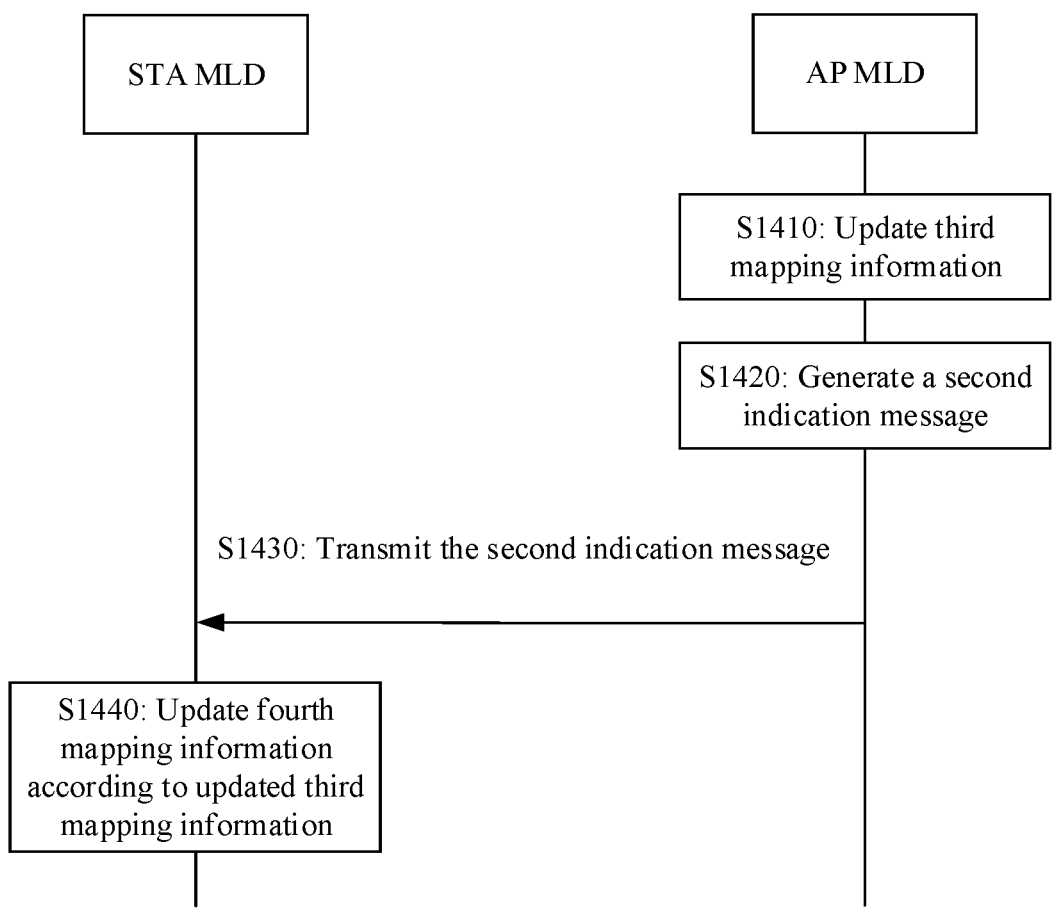
FIG. 14 is an interactive flow chart of another wireless communication method provided by the embodiments of the present disclosure.

FIG. 14 is an interactive flow chart of another wireless communication method provided by the embodiments of the present disclosure. As shown in FIG. 14, the method includes the following operations.

In operation S1410, the AP MLD updates the third mapping information.

In operation S1420, the AP MLD generates the second indication message.

In operation S1430, the AP MLD transmits the second indication message to the STA MLD.

In operation S1440, the STA MLD updates the fourth mapping information according to the updated third mapping information.

It should be understood that the third mapping information is TID to downlink mapping information at the AP MLD side.

It should be understood that the TID referred to in the third mapping information may be all downlink TIDs of the AP MLD, or the downlink TID whose corresponding mapping information is to be updated, which is not limited by the present disclosure.

It should be understood that the TID referred to in the third mapping information may be one or more. If there is one TID, the third mapping information is TID to downlink mapping information at the AP MLD side. If there are more TIDs, the third mapping information is the mapping information for the more TIDs to downlinks at the AP MLD side.

It should be understood that one TID may be correspond to or mapped to at least one link. For example: TID1 may be mapped to link 1 and link 2, and TID2 may be mapped to link 1.

It should be understood that the AP MLD may update the first mapping information in the contraction scenario as above.

Figure 15:
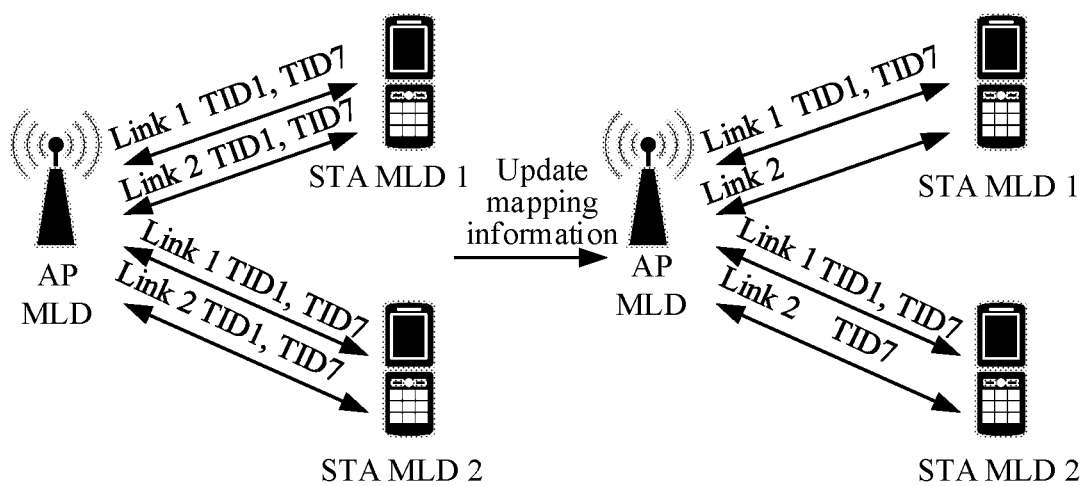
FIG. 15 is a schematic diagram for updating TID-to-link mapping information provided by the embodiments of the present disclosure.

Exemplarily, FIG. 15 is a schematic diagram for updating TID-to-link mapping information provided by the embodiments of the present disclosure. As shown in FIG. 15, two links, link 1 and link 2, are respectively established between the AP MLD and the two STA MLDs STA MLD 1 and STA MLD 2. In the initial state, for the above STA MLD 1 and STA MLD 2, TID1 and TID7 are both mapped to link 1 and link 2. For example, at this time, STA MLD2 has a large number of service flows of TID7, and the AP MLD has the system optimization requirement. In order to ensure the service flow requirement of TID7 of STA MLD2, the AP MLD only selects link 2 for transmitting service flows of TID7 according to the link state of STA MLD2. For STA MLD1, TID1 and TID7 are mapped to link 1, and link 2 is not mapped to TID. At this time, the AP MLD performs the remapping mandatory mode to update the mapping information for various TIDs to links.

Alternatively, an accessory AP of the AP MLD may transmit the second indication message to the accessory station in the STA MLD.

Alternatively, the downlink corresponding to the accessory station is in an enabled state.

Alternatively, the downlink corresponding to the accessory AP is in an enabled state.

Alternatively, the AP MLD may transmit the second indication message to the plurality of STA MLDs by adopting an Orthogonal Frequency Division Multiple Access (OFDMA) manner, but is not limited thereto.

It should be understood that the above second indication message may be an implicit indication message or an explicit indication message, which is not limited by the present disclosure.

It should be understood that the second indication message is used to indicate that the STA MLD does not need to respond to the AP MLD for the second indication message.

That is, the second indication message is used to indicate that the remapping mandatory mode is adopted. In addition, the second indication message includes the updated third mapping information.

Alternatively, the updated third mapping information includes mapping information for at least one TID to a corresponding downlink set.

It should be noted that when the TID referred to in the third mapping information is all downlink TIDs of the AP MLD, the above at least one TID may be all downlink TIDs of the AP MLD. When the TID referred to in the third mapping information is the downlink TID whose corresponding mapping information is to be updated, the above at least one TID may be the downlink TID whose corresponding mapping information is to be updated.

Alternatively, for any one of the at least one TID, the downlink set corresponding to the TID is a non-empty subset of an established downlink set between the STA MLD and the AP MLD after updating the third mapping information.

Alternatively, for any one of the at least one TID, the downlink set corresponding to the TID is a non-empty subset of the second mapping link set between the STA MLD and the AP MLD after updating the third mapping information. The second mapping link set is a downlink set corresponding to the TID before updating the third mapping information.

Further, after receiving the updated third mapping information, the STA MLD updates the fourth mapping information. The fourth mapping information is TID to downlink mapping information at the STA MLD side.

It should be understood that the TID referred to in the fourth mapping information may be all downlink TIDs of the AP MLD, or the downlink TID whose corresponding mapping information is to be updated, which is not limited by the present disclosure.

It should be understood that the TID referred to in the fourth mapping information may be one or more. If there is one TID, the fourth mapping information is TID to downlink mapping information at the STA MLD side. If there are more TIDs, the fourth mapping information is the mapping information for the more TIDs to downlinks at the STA MLD side.

It should be understood that the fourth mapping information is the same as the fourth mapping information before updating the third mapping information and the fourth mapping information, i.e., at the initial phase.

It should be understood that the updated third mapping information is the same as the updated fourth mapping information. That is, the TID-to-link mapping information is consistent at the STA MLD side and the AP MLD side.

In view of above, in the present disclosure, a remapping mandatory mode may be adopted. That is, the STA MLD does not need to respond to the AP MLD for the second indication message, thereby reducing signaling overhead.

As mentioned above, the second indication message may be an implicit indication message or an explicit indication message, That is, the implicit manner may be adopted to indicate that the STA MLD does not need to respond to the AP MLD for the second indication message, or the explicit manner may be adopted to indicate that the STA MLD does not need to respond to the AP MLD for the second indication message. These two manners will be explained respectively below.

Embodiment 5

The second indication message may be an explicit indication message. For example, the second indication message includes second indication information. The second indication information is used to indicate that the STA MLD does not need to respond to the AP MLD for the second indication message. The carrying manner for the second indication message will be explained by example below.

Figure 16:
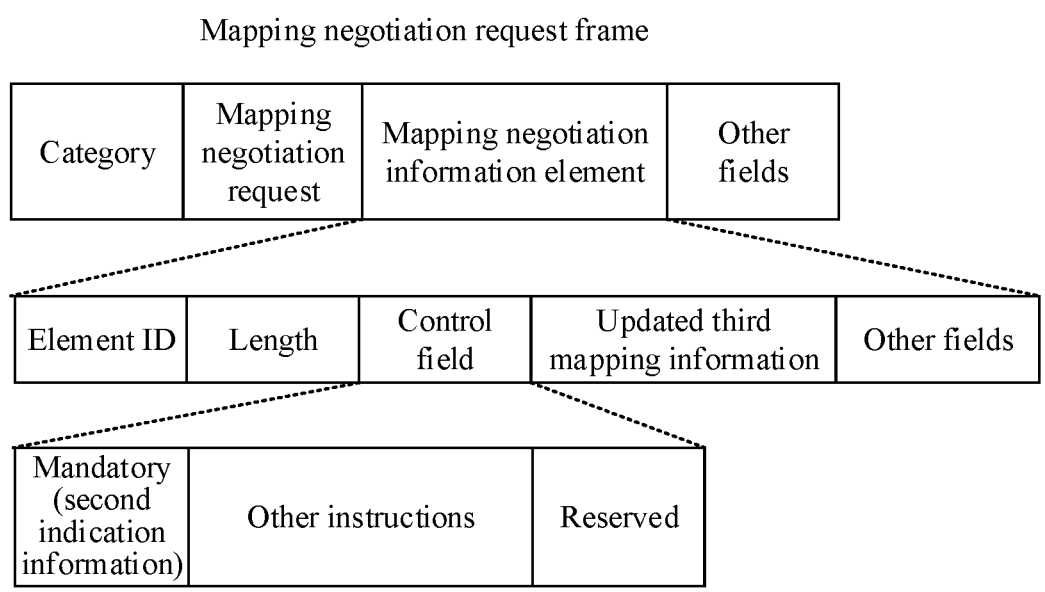
FIG. 16 is a schematic diagram of a mapping negotiation request frame provided by the embodiments of the present disclosure.

In the example 1, FIG. 16 is a schematic diagram of a mapping negotiation request frame provided by the embodiments of the present disclosure. As shown in FIG. 16, the mapping negotiation request frame includes a mapping negotiation information element. The mapping negotiation information element includes second indication information and updated third mapping information. Alternatively, the second indication information may be carried in a mandatory field in a control field in the mapping negotiation information element. In addition, the mapping negotiation request frame may also include a category field, a mapping negotiation request field, and other fields, etc. Other fields except the mapping negotiation information element in the mapping negotiation request frame are not limited in the present disclosure.

It should be understood that the mapping negotiation request frame is a form of action frame.

Alternatively, the category field may be filled with an EHT category.

Alternatively, the length of the second indication information may be 1 bit. The second indication information may be 1. It is indicated that the STA MLD does not need to respond to the AP MLD for the second indication message. If the field in which the second indication information is located is not filled with 1, for example, it is filled with 0, it is indicated that the STA MLD needs to respond to the AP MLD for the second indication message.

It should be noted that the mapping negotiation request frame provided in FIG. 16 is an improvement of the mapping negotiation request frame in the prior art, in which the mapping negotiation request frame does not have the mandatory field. In the present disclosure, the mapping negotiation request frame carries a mandatory field, which may be used to fill the second indication information.

Figure 17:
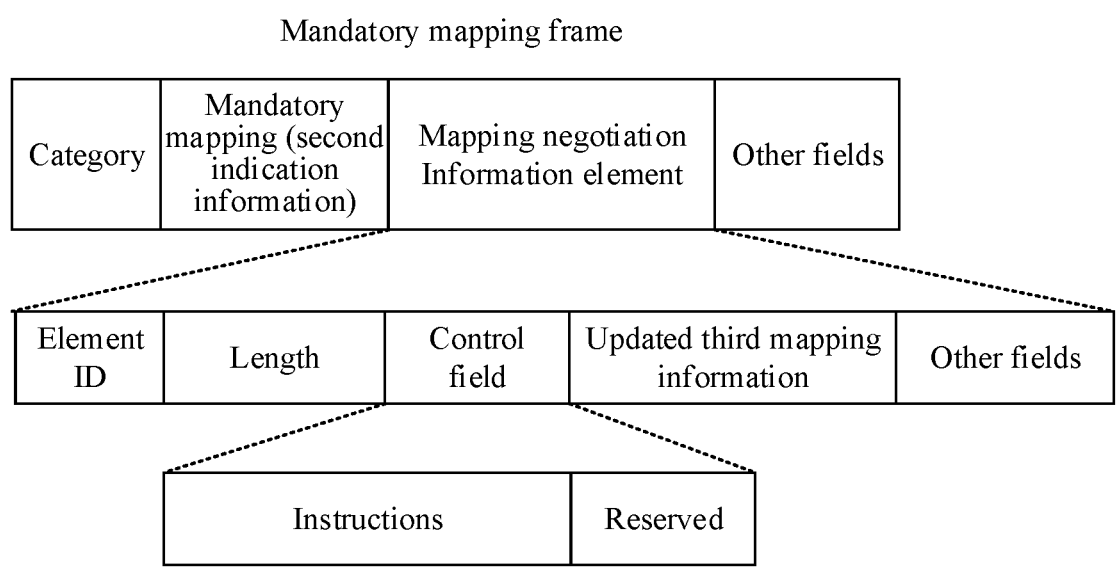
FIG. 17 is a schematic diagram of a mandatory mapping frame provided by the embodiments of the present disclosure.

In the example 2, FIG. 17 is a schematic diagram of a mandatory mapping frame provided by the embodiments of the present disclosure. As shown in FIG. 17, the mandatory mapping frame includes a mandatory mapping field and a mapping negotiation information element. The mandatory mapping field may be filled with second indication information. The mapping negotiation information element includes updated third mapping information. In addition, the mandatory mapping frame may also include a category field and other fields, etc. Other fields except the mapping negotiation information element in the mandatory mapping frame are not limited in the present disclosure.

It should be understood that the mandatory mapping frame is a form of the action frame.

Alternatively, the category field may be filled with an EHT category.

It should be noted that the mandatory mapping frame provided in FIG. 17 differs from the mapping negotiation request frame provided in FIG. 16 in that the mandatory mapping frame provided in FIG. 17 does not carry the mandatory field in the mapping negotiation information element.

It should be understood that the carrying manner of the second indication information is not limited to the cases shown in FIG. 16 and FIG. 17. The second indication information may also be carried in other frames, or in other fields in the mapping negotiation request frame or the mandatory mapping frame, which is not limited by the present disclosure.

Further, after the STA MLD receives the mapping negotiation request frame, the mandatory field in the mapping negotiation request frame is resolved. If the second indication information is carried in the mandatory field, for example, 1 is carried, it represents that there is no need to respond to the AP MLD for the mapping negotiation request frame. If the second indication information is not carried in the mandatory field, for example, 0 is carried, it represents that it is needed to respond to the AP MLD for the mapping negotiation request frame. Alternatively, after the STA MLD receives the mandatory mapping frame, if the mandatory mapping field after the category field is resolved, it represents that there is no need to respond to the AP MLD for the mandatory mapping frame.

In the present disclosure, the second indication message may explicitly indicate that the STA MLD does not need to respond to the AP MLD for the second indication message, thereby reducing signaling overhead.

Embodiment 6

The second indication message may be an implicit indication message. The implicit indication manner will be illustrated by examples below.

Alternatively, after receiving the second indication message, the STA MLD resolves and obtains the updated third mapping information. Based on this, the fourth mapping information is updated. Further, the STA MLD may enter the following comparison: whether the downlink set corresponding to each TID is a non-empty subset of the second mapping link set between the STA MLD and the AP MLD. If so, it is determined that there is no need to respond to the AP MLD for the second indication message.

The carrying manner of the second indication message will be explained by example below.

Figure 18:
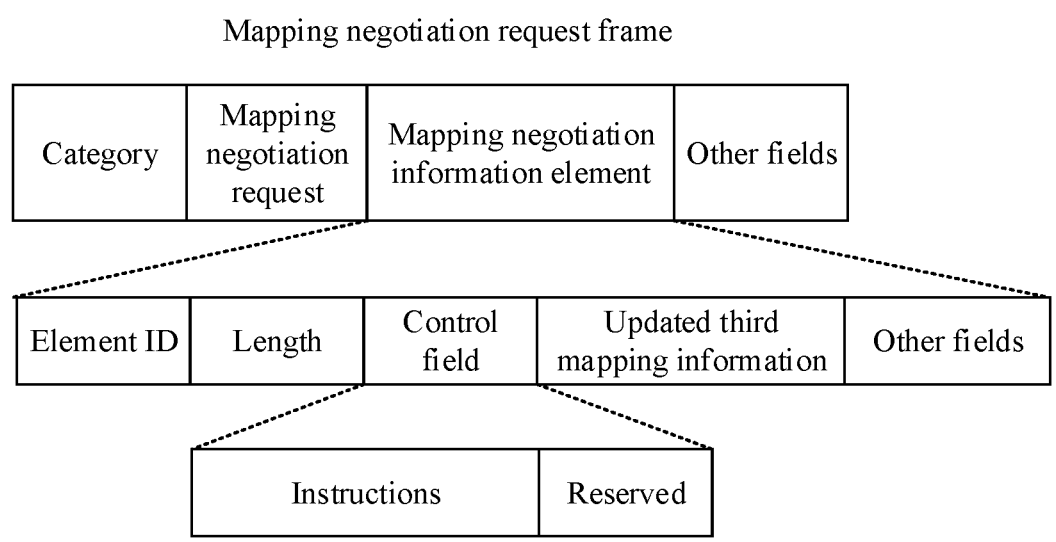
FIG. 18 is a schematic diagram of a mapping negotiation request frame provided by the embodiments of the present disclosure.

FIG. 18 is a schematic diagram of a mapping negotiation request frame provided by the embodiments of the present disclosure. As shown in FIG. 18, the mapping negotiation request frame includes a mapping negotiation information element. The mapping negotiation information element includes the updated third mapping information, but does not include the second indication information. In addition, the mapping negotiation request frame may also include a category field, a mapping negotiation request field and other fields, etc. Other fields except the mapping negotiation information element in the mapping negotiation request frame are not limited in the present disclosure.

It should be understood that the mapping negotiation request frame is a form of action frame.

Alternatively, the category field may be filled with an EHT category.

In the present disclosure, the second indication message may implicitly indicate that the STA MLD does not need to respond to the AP MLD for the second indication message, thereby reducing signaling overhead.

Embodiment 7

Figure 19:
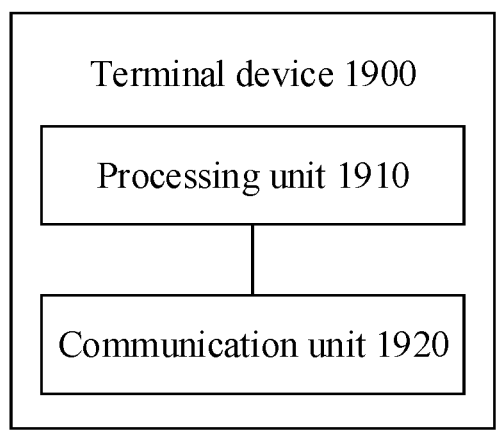
FIG. 19 is a schematic diagram of a terminal device 1900 provided by the embodiments of the present disclosure.

FIG. 19 is a schematic diagram of a terminal device 1900 provided by the embodiments of the present disclosure. The terminal device 1900 is a STA MLD. The STA MLD includes a processing unit 1910 and a communication unit 1920. The processing unit 1910 is configured to update first mapping information and generate a first indication message. The first mapping information is TID to uplink mapping information at a STA MLD side. The communication unit 1920 is configured to transmit the first indication message to an AP MLD. The first indication message is configured to indicate that the AP MLD does not need to respond to the STA MLD for the first indication message, and the first indication message includes updated first mapping information.

Alternatively, the first indication message includes first indication information. The first indication information is configured to indicate that the AP MLD does not need to respond to the STA MLD for the first indication message.

Alternatively, the updated first mapping information includes mapping information for at least one TID to corresponding uplink set.

Alternatively, for any one of the at least one TID, the uplink set corresponding to the TID is a non-empty subset of an established uplink set between the STA MLD and the AP MLD after updating the first mapping information.

Alternatively, for any one of the at least one TID, the uplink set corresponding to the TID is a non-empty subset of a first mapping link set between the STA MLD and the AP MLD after updating the first mapping information. The first mapping link set is an uplink set corresponding to the TID before updating the first mapping information.

Alternatively, the communication unit 1920 is specifically configured to transmit the first indication message to an accessory AP of the AP MLD.

Alternatively, an uplink corresponding to the accessory AP is in an enabled state.

Alternatively, in some embodiments, the above communication unit may be a communication interface, a transceiver or an input-output interface of a communication chip or a system-on-chip.

It should be understood that the terminal device 1900 in the embodiments of the present disclosure may correspond to a STA MLD in the method embodiments of the present disclosure. The above and other operations and/or functions of the various units in the terminal device 1900 are used to implement the corresponding flow of the STA MLD in the above method embodiments respectively. For the sake of brevity, elaborations are omitted herein.

Embodiment 8

Figure 20:
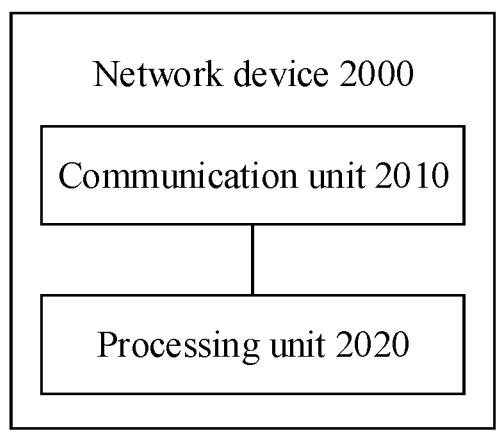
FIG. 20 is a schematic diagram of a network device 2000 provided by the embodiments of the present disclosure.

FIG. 20 is a schematic diagram of a network device 2000 provided by the embodiments of the present disclosure. The network device 2000 is an AP MLD. The AP MLD includes a communication unit 2010 and a processing unit 2020. The communication unit 2010 is used to receive a first indication message. The first indication message includes updated first mapping information. The processing unit 2020 is configured to update second mapping information according to the updated first mapping information. The first mapping information is TID to uplink mapping information at a STA MLD side. The second mapping information is TID to uplink mapping information at an AP MLD side. The first indication message is configured to indicate that the AP MLD does not need to respond to a STA MLD for the first indication message Alternatively, the first indication message includes first indication information. The first indication information is configured to indicate that the AP MLD does not need to respond to the STA MLD for the first indication message.

Alternatively, the updated first mapping information includes mapping information for at least one TID to a corresponding uplink set.

Alternatively, for any one of the at least one TID, the uplink set corresponding to the TID is a non-empty subset of an established uplink set between the STA MLD and the AP MLD after updating the first mapping information.

Alternatively, for any one of the at least one TID, the uplink set corresponding to the TID is a non-empty subset of a first mapping link set between the STA MLD and the AP MLD after updating the first mapping information. The first mapping link set is an uplink set corresponding to the TID before updating the first mapping information.

Alternatively, the communication unit 2010 is specifically configured to receive the first indication message from an accessory station in the STA MLD.

Alternatively, an uplink corresponding to the accessory station is in an enabled state.

Alternatively, in some embodiments, the above communication unit may be a communication interface, a transceiver or an input-output interface of a communication chip or a system-on-chip.

It should be understood that the network device 2000 in the embodiments of the present disclosure may correspond to an AP MLD in the method embodiments of the present disclosure. The above and other operations and/or functions of the various units in the network device 2000 are used to implement the corresponding flow of the AP MLD in the above method embodiments respectively. For the sake of brevity, elaborations are omitted herein.

Embodiment 9

Figure 21:
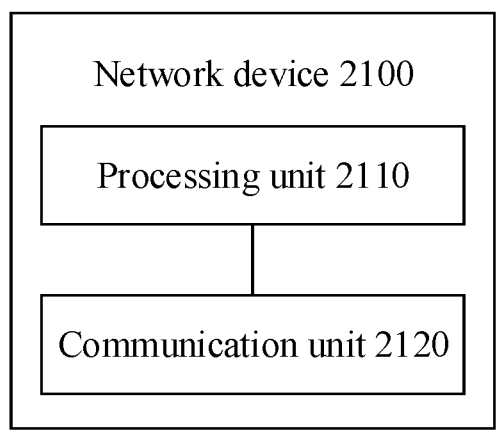
FIG. 21 is a schematic diagram of a network device 2100 provided by the embodiments of the present disclosure.

FIG. 21 is a schematic diagram of a network device 2100 provided by the embodiments of the present disclosure. The network device 2100 is an AP MLD. The AP MLD includes a processing unit 2110 and a communication unit 2120. The processing unit 2110 is configured to update third mapping information, and generate a second indication message. The third mapping information is TID to downlink mapping information at an AP MLD side. The communication unit 2120 is configured to transmit the second indication message to a STA MLD. The second indication message is configured to indicate that the STA MLD does not need to respond to the AP MLD for the second indication message. The second indication message includes updated third mapping information.

Alternatively, the indication message includes second indication information. The second indication information is configured to indicate that the STA MLD does not need to respond to the AP MLD for the second indication message.

Alternatively, the updated third mapping information includes mapping information for at least one TID to a corresponding downlink set.

Alternatively, for any one of the at least one TID, the downlink set corresponding to the TID is a non-empty subset of an established downlink set between the STA MLD and the AP MLD after updating the third mapping information.

Alternatively, for any one of the at least one TID, the downlink set corresponding to the TID is a non-empty subset of a second mapping link set between the STA MLD and the AP MLD after updating the third mapping information. The second mapping link set is a downlink set corresponding to each TID before updating the third mapping information.

Alternatively, the communication unit 2120 is specifically configured to transmit the second indication message to an accessory station in the STA MLD.

Alternatively, a downlink corresponding to the accessory station is in an enabled state.

Alternatively, in some embodiments, the above communication unit may be a communication interface, a transceiver or an input-output interface of a communication chip or a system-on-chip.

It should be understood that the network device 2100 in the embodiments of the present disclosure may correspond to an AP MLD in the method embodiments of the present disclosure. The above and other operations and/or functions of the various units in the network device 2100 are used to implement the corresponding flow of the AP MLD in the above method embodiments respectively. For the sake of brevity, elaborations are omitted herein.

Embodiment 10

Figure 22:
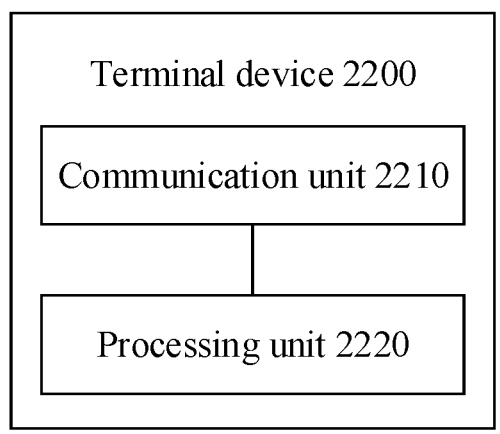
FIG. 22 is a schematic diagram of a terminal device 2200 provided by the embodiments of the present disclosure.

FIG. 22 is a schematic diagram of a terminal device 2200 provided by the embodiments of the present disclosure. The terminal device 2200 is a STA MLD. The STA MLD includes a communication unit 2210 and a processing unit 2220. The communication unit 2210 is configured to receive a second indication message. The second indication message includes updated third mapping information. The processing unit 2220 is configured to update fourth mapping information according to the updated third mapping information. The third mapping information is TID to downlink mapping information at an AP MLD side. The fourth mapping information is TID to downlink mapping information at the STA MLD side, and the second indication message is configured to indicate that the STA MLD does not need to respond to an AP MLD for the second indication message.

Alternatively, the second indication message includes second indication information. The second indication information is configured to indicate that the STA MLD does not need to respond to the AP MLD for the second indication message.

Alternatively, the updated third mapping information includes mapping information for at least one TID to a corresponding downlink set.

Alternatively, for any one of the at least one TID, the downlink set corresponding to the TID is a non-empty subset of an established downlink set between the STA MLD and the AP MLD after updating the third mapping information.

Alternatively, for any one of the at least one TID, the downlink set corresponding to the TID is a non-empty subset of a second mapping link set between the STA MLD and the AP MLD after updating the third mapping information. The second mapping link set is a downlink set corresponding to the TID before updating the third mapping information.

Alternatively, the communication unit 2210 is specifically configured to receive the second indication message from an accessory AP of the AP MLD.

Alternatively, a downlink corresponding to the accessory AP is in an enabled state.

Alternatively, in some embodiments, the above communication unit may be a communication interface, a transceiver or an input-output interface of a communication chip or a system-on-chip.

It should be understood that the terminal device 2200 in the embodiments of the present disclosure may correspond to a STA MLD in the method embodiments of the present disclosure. The above and other operations and/or functions of the various units in the terminal device 2200 are used to implement the corresponding flow of the STA MLD in the above method embodiments respectively. For the sake of brevity, elaborations are omitted herein.

Embodiment 11

Figure 23:
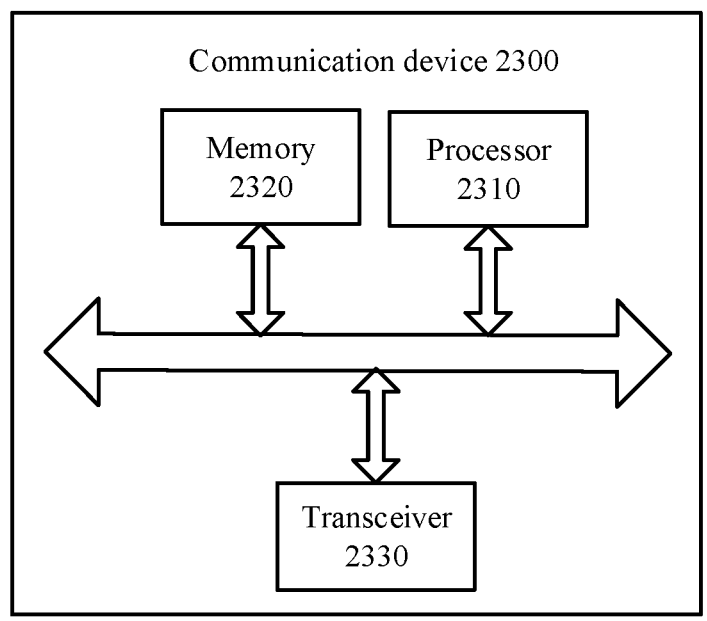
FIG. 23 is a schematic structural diagram of a communication device 2300 provided by the embodiments of the present disclosure.

FIG. 23 is a schematic structural diagram of a communication device 2300 provided by the embodiments of the present disclosure. The communication device 2300 shown in FIG. 23 includes a processor 2310. The processor 2310 may invoke and run computer programs from a memory to implement the methods in the embodiments of the present disclosure.

Alternatively, as shown in FIG. 23, the communication device 2300 may further include a memory 2320. The processor 2310 may invoke and run computer programs from the memory 2320 to implement the methods in the embodiments of the present disclosure.

The memory 2320 may be a separate device independent of the processor 2310 or may be integrated in the processor 2310.

Alternatively, as shown in FIG. 23, the communication device 2300 may further include a transceiver 2330. The processor 2310 may control the transceiver 2330 to communicate with other devices. Specifically, the transceiver 2330 may transmit information or data to other devices, or receive information or data transmitted by other devices.

The transceiver 2330 may include a transmitter and a receiver. The transceiver 2330 may further include antennas. The number of antennas may be one or more.

Alternatively, the communication device 2300 may be specifically a network device of the embodiments of the present disclosure. The communication device 2300 may implement the corresponding flow implemented by the AP MLD in various method embodiments of the present disclosure. For the sake of brevity, elaborations are omitted herein.

Alternatively, the communication device 2300 may specifically be a terminal device of the embodiments of the present disclosure. The communication device 2300 may implement the corresponding flow implemented by the STA MLD in various method embodiments of the present disclosure. For the sake of brevity, elaborations are omitted herein.

Embodiment 12

Figure 24:
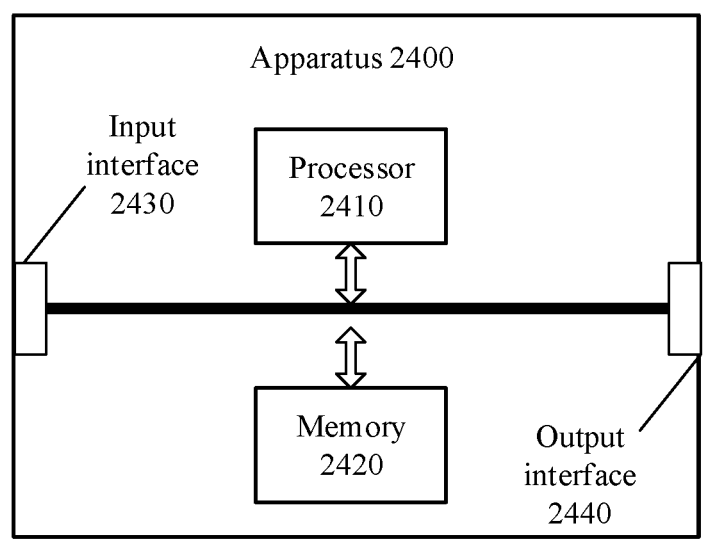
FIG. 24 is a schematic structural diagram of an apparatus according to the embodiments of the present disclosure.

FIG. 24 is a schematic structural diagram of an apparatus according to the embodiments of the present disclosure. The apparatus 2400 shown in FIG. 24 includes a processor 2410. The processor 2410 may invoke and run computer programs from a memory to implement the method embodiments of the present disclosure.

Alternatively, as shown in FIG. 24, the apparatus 2400 may further include a memory 2420. The processor 2410 may invoke and run computer programs from the memory 2420 to implement the methods in embodiments of the present disclosure.

The memory 2420 may be a separate device independent of the processor 2410 or may be integrated in the processor 2410.

Alternatively, the apparatus 2400 may further include an input interface 2430. The processor 2410 may control the input interface 2430 to communicate with other devices or chips. Specifically, the input interface 2430 may acquire information or data transmitted by other devices or chips.

Alternatively, the apparatus 2400 may further include an output interface 2440. The processor 2410 may control the output interface 2440 to communicate with other devices or chips. Specifically, the output interface 2440 may output information or data to other devices or chips.

Alternatively, the apparatus may be applied to the AP MLD in the embodiments of the present disclosure. The apparatus may implement corresponding flow implemented by the AP MLD in the various method embodiments of the present disclosure. For the sake of brevity, elaborations are omitted herein.

Alternatively, the apparatus may be applied to the STA MLD in the embodiments of the present disclosure. The apparatus may implement corresponding flow implemented by the STA MLD in the various methods embodiments of the present disclosure. For the sake of brevity, elaborations are omitted herein.

Alternatively, the apparatus mentioned in the embodiments of the present disclosure may also be a chip. For example, the apparatus may be a system level chip, a system chip, a chip system or a system on a chip.

Embodiment 13

Figure 25:
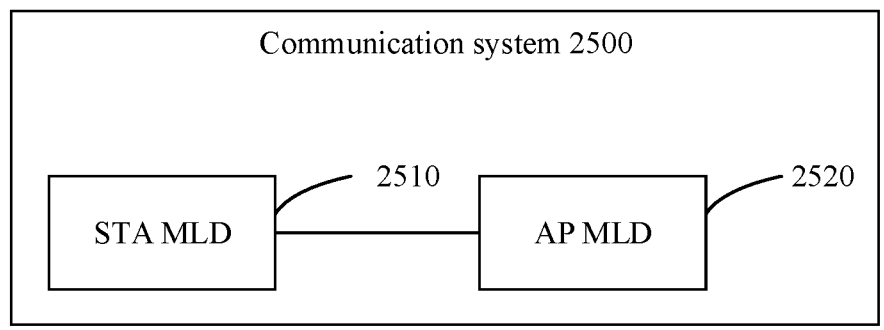
FIG. 25 is a schematic block diagram of a communication system 2500 provided by the embodiments of the present disclosure.

FIG. 25 is a schematic block diagram of a communication system 2500 provided by the embodiments of the present disclosure. As shown in FIG. 25, the communication system 2500 includes a STA MLD 2510 and an AP MLD 2520.

The STA MLD 2510 may be used to implement the corresponding functions implemented by the STA MLD in the above methods, and the AP MLD 2520 may be used to implement the corresponding functions implemented by the AP MLD in the above methods. For the sake of brevity, elaborations are omitted herein.

It should be understood that the processor of the embodiments of the present disclosure may be an integrated circuit chip having signal processing capability. In implementation, the various steps of the above method embodiments may be completed by integrated logic circuitry of hardware in the processor or instructions in the form of software. The processor may be a general purpose processor, a Digital Signal Processor (DSP), an Application Specific Integrated Circuit (ASIC), a Field Programmable Gate Array (FPGA) or other programmable logic devices, discrete gates or transistor logic devices, or discrete hardware components. The methods, steps and logic block diagrams disclosed in embodiments of the present disclosure may be implemented or performed by the processor. The general purpose processor may be a microprocessor or the processor may be any conventional processor or the like. The steps of the method disclosed in combination with the embodiments of the present disclosure may be directly embodied as the execution of the hardware decoding processor or the combined execution of the hardware and software modules in the decoding processor. The software module may be located in random-access memory (RAM), flash memory, read-only memory, programmable read-only memory or electrically erasable programmable memory, registers and other storage medium mature in the art. The storage medium is located in the memory, and the processor reads the information in the memory and completes the steps of the methods in combination with its hardware.

It is understood that the memory in embodiments of the present disclosure may be volatile memory or non-volatile memory or may include both volatile and non-volatile memory. The non-volatile memory may be Read-Only Memory (ROM), Programmable ROM (PROM), Erasable PROM (EPROM), Electrically Erasable EPROM (EEPROM), or flash memory. The volatile memory may be a Random Access Memory (RAM) which serves as an external cache. By way of illustration but not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memory of the systems and methods described herein is intended to include but not limited to these and any other suitable types of memory.

It should be understood that the memory described above is exemplary but not limiting. For example, the memory in embodiments of the present disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), Direct Rambus RAM (DR RAM), etc. That is, the memory in embodiments of the present disclosure is intended to include but not limited to these and any other suitable types of memory.

The embodiments of the present disclosure also provide a computer readable storage medium for storing computer programs.

Alternatively, the computer-readable storage medium may be applied to a network device or a base station in the embodiments of the present disclosure. The computer programs cause a computer to perform corresponding flow implemented by the network device or the base station in the various method embodiments of the present disclosure. For the sake of brevity, elaborations are omitted herein.

Alternatively, the computer-readable storage medium may be applied to the mobile terminal/terminal device in the embodiments of the present disclosure. The computer programs cause the computer to perform corresponding flow implemented by the mobile terminal/terminal device in the various method embodiments of the present disclosure. For the sake of brevity, elaborations are omitted herein.

The embodiments of the present disclosure also provide a computer program product including computer program instructions.

Alternatively, the computer program product may be applied to a network device or a base station in the embodiments of the present disclosure. The computer program instructions cause a computer to perform corresponding flow implemented by the network device or the base station in the various method embodiments of the present disclosure. For the sake of brevity, elaborations are omitted herein.

Alternatively, the computer program product may be applied to the mobile terminal/terminal device in the embodiments of the present disclosure. The computer program instructions cause the computer to perform the corresponding flow implemented by the mobile terminal/terminal device in the various method embodiments of the present disclosure. For the sake of brevity, elaborations are omitted herein.

The embodiments of the present disclosure also provide a computer program.

Alternatively, the computer program may be applied to a network device or a base station in the embodiments of the present disclosure. When the computer program is run on the computer, the computer performs the corresponding flow implemented by the network device or the base station in the various method embodiments of the present disclosure. For the sake of brevity, elaborations are omitted herein.

Alternatively, the computer program may be applied to the mobile terminal/terminal device in the embodiments of the present disclosure. When the computer program is run on the computer, the computer performs the corresponding flow implemented by the mobile terminal/terminal device in the various method embodiments of the present disclosure. For the sake of brevity, elaborations are omitted herein.

Those skilled in the art will appreciate that the various example units and algorithm steps described in combination with the embodiments disclosed herein may be implemented in electronic hardware or a combination of computer software and electronic hardware. Whether these functions are performed in hardware or software depends on the specific application and design constraints of the technical solutions. Skilled artisans may use different methods for each specific application to implement the described function, but such implementation should not be considered outside the scope of the present disclosure.

Those skilled in the art will clearly appreciate that, for convenience and conciseness of description, the specific operating processes of the above-described systems, apparatuses and units may refer to the corresponding processes in the above method embodiments. Elaborations are omitted herein.

In several embodiments provided herein, it should be understood that the disclosed systems, apparatuses and methods may be implemented in other ways. For example, the above apparatus embodiments are only schematic. For example, the division of the units is only a logical function division, and in practice, there may be another division manner. For example, multiple units or components may be combined or integrated into another system, or some features may be ignored or not performed. On the other hand, the coupling or direct coupling or communication connection between each other shown or discussed may be indirect coupling or communication connection through some interface, device or unit, and may be electrical, mechanical or other form.

The units illustrated as separate elements may or may not be physically separated, and the elements displayed as units may or may not be physical units. That is, the units may be located in one place, or may be distributed over a plurality of network units. Part or all of the units may be selected according to the actual needs to achieve the purpose of the embodiments.

In addition, various functional units in various embodiments of the present disclosure may be integrated in one processing unit, various units may exist physically alone, or two or more units may be integrated in one unit.

The functions may be stored in a computer readable storage medium if implemented in the form of software functional units and sold or used as stand-alone products. In view of this understanding, the technical solutions of the present disclosure in essence or the part that contributes to the prior art or the part of the technical solutions may be embodied in the form of a software product. The computer software product is stored in a storage medium and includes instructions for causing a computer device (which may be a personal computer, server, network device, etc.) to perform all or part of the steps of the method described in various embodiments of the present disclosure. The above storage medium includes a U disk, a removable hard disk, a Read-Only Memory (ROM), a Random Access Memory (RAM), a magnetic disk or an optical disk and other medium capable of storing program codes.

The above is only the specific embodiments of the present disclosure, but the scope of protection of the present disclosure is not limited thereto. Any person skilled in the art who is familiar with the technical filed can easily think of changes or substitutions, which should cover within the scope of protection of the present disclosure. Therefore, the protection scope of the present disclosure should be subject to the protection scope of the claims.

The invention claimed is:

1. A wireless communication method, comprising:
updating first mapping information, wherein the first mapping information identifier (TID) to link mapping information at a station (STA) multi-link device (MLD), wherein the TID to link mapping information is TID-to-uplink mapping information;
generating a first indication message; and
transmitting the first indication message to an access point (AP) MLD,
wherein the first indication message is configured to indicate that the AP MLD does not need to respond to the STA MLD for the first indication message, and the first indication message comprises updated TID-to-uplink mapping information.

2. The method of claim 1, wherein an establishment of the TID-to-uplink mapping information is included in a multi-link establishment phase.

3. The method of claim 1, wherein the TID-to-uplink mapping information is placed as a field in multi-link (ML) information element of an association request or response frame used in a multi-link establishment phase.

4. The method of claim 1, wherein the first indication message is included in a mapping negotiation request frame.

5. The method of claim 4, wherein the mapping negotiation request frame includes a mapping negotiation information element.

6. The method of claim 5, wherein the mapping negotiation information element includes updated TID-to-uplink mapping information.

7. The method of claim 5, wherein the mapping negotiation request frame is a form of action frame.

8. A terminal device, wherein the terminal device is a station (STA) multi-link device (MLD) and comprises a processor and a memory, wherein the memory is configured to store computer programs, and processor is configured to invoke and run the computer programs stored in the memory to perform:
updating first mapping information, wherein the first mapping information is traffic identifier (TID) to link mapping information at a station (STA) multi-link device (MLD), wherein the TID to link mapping information is TID-to-uplink mapping information, and
generating a first indication message; and
transmitting the first indication message to an access point (AP) multi-link device (MLD);
wherein the first indication message is configured to indicate that the AP MLD does not need to respond to the STA MLD for the first indication message, and the first indication message comprises updated TID-to-uplink mapping information.

9. The terminal device of claim 8, wherein an establishment of the TID-to-uplink mapping information is included in a multi-link establishment phase.

10. The terminal device of claim 8, wherein the TID-to-uplink mapping information is placed as a field in multi-link (ML) information element of an association request or response frame used in a multi-link establishment phase.

11. The terminal device of claim 8, wherein the first indication message is included in a mapping negotiation request frame, and the mapping negotiation request frame includes a mapping negotiation information element.

12. The terminal device of claim 11, wherein the mapping negotiation information element includes updated TID-to-uplink mapping information.

13. The terminal device of claim 11, wherein the mapping negotiation request frame is a form of action frame.

* * * * *